(12) United States Patent
Itou et al.

(10) Patent No.: US 8,259,269 B2
(45) Date of Patent: Sep. 4, 2012

(54) LIQUID CRYSTAL DISPLAY DEVICE WITH PIXEL ELECTRODE OR COMMON ELECTRODE HAVING SLIT LIKE APERTURE WITH INCREASING WIDTH

(75) Inventors: Osamu Itou, Hitachi (JP); Masaya Adachi, Hitachi (JP); Shinichiro Oka, Hitachi (JP)

(73) Assignees: Hitachi Displays, Ltd., Chiba-ken (JP); Panasonic Liquid Crystal Display Co.. Ltd., Hyogo-ken (JP)

( * ) Notice: Subject to any disclaimer, the term of this patent is extended or adjusted under 35 U.S.C. 154(b) by 958 days.

(21) Appl. No.: 11/494,716

(22) Filed: Jul. 28, 2006

(65) Prior Publication Data
US 2007/0024789 A1 Feb. 1, 2007

(30) Foreign Application Priority Data
Jul. 29, 2005 (JP) ................................. 2005-220533

(51) Int. Cl.
G02F 1/1337 (2006.01)
G02F 1/1343 (2006.01)
(52) U.S. Cl. ........ 349/129; 349/128; 349/130; 349/141; 349/142; 349/144; 349/146
(58) Field of Classification Search .......... 349/128–130, 349/141–147
See application file for complete search history.

(56) References Cited

U.S. PATENT DOCUMENTS

| | | | |
|---|---|---|---|
| 6,256,081 B1 * | 7/2001 | Lee et al. ...................... | 349/141 |
| 6,504,592 B1 * | 1/2003 | Takatori et al. ............... | 349/129 |
| 6,882,395 B2 * | 4/2005 | Liu ............................... | 349/141 |
| 7,023,516 B2 * | 4/2006 | Yoshida et al. ............... | 349/143 |
| 7,492,428 B2 * | 2/2009 | Lee ............................... | 349/141 |
| 2005/0179844 A1 * | 8/2005 | Roosendaal et al. .......... | 349/139 |

FOREIGN PATENT DOCUMENTS
JP 2004-102001 4/2004
* cited by examiner

*Primary Examiner* — Mark Robinson
*Assistant Examiner* — Paisley L Arendt
(74) *Attorney, Agent, or Firm* — Antonelli, Terry, Stout & Kraus, LLP.

(57) ABSTRACT

A VA liquid crystal display device is capable of performing display under the wide environments including a bright place and a dark place, transmission display with a wide viewing angle and a high image quality, and improves the gray scale productivity in an oblique direction. An alignment control structure (projection structure) is disposed in a direction orthogonal to the slits of a common electrode (comb-like electrode), a lateral electric field is applied to a liquid crystal layer that is vertically aligned by the comb-like electrode, and the alignment of the liquid crystal is controlled to a different direction to make multi-domains in the VA liquid crystal display device. Also, the multi-domains are performed by continuously changing the pitches of the slits.

17 Claims, 32 Drawing Sheets

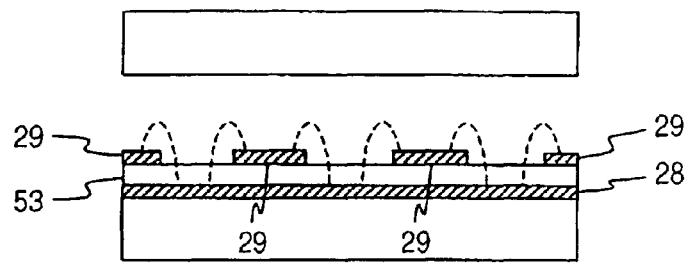
FIG. 19A
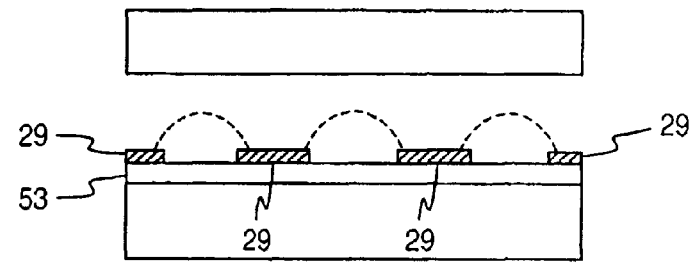
FIG. 19B
FIG. 20
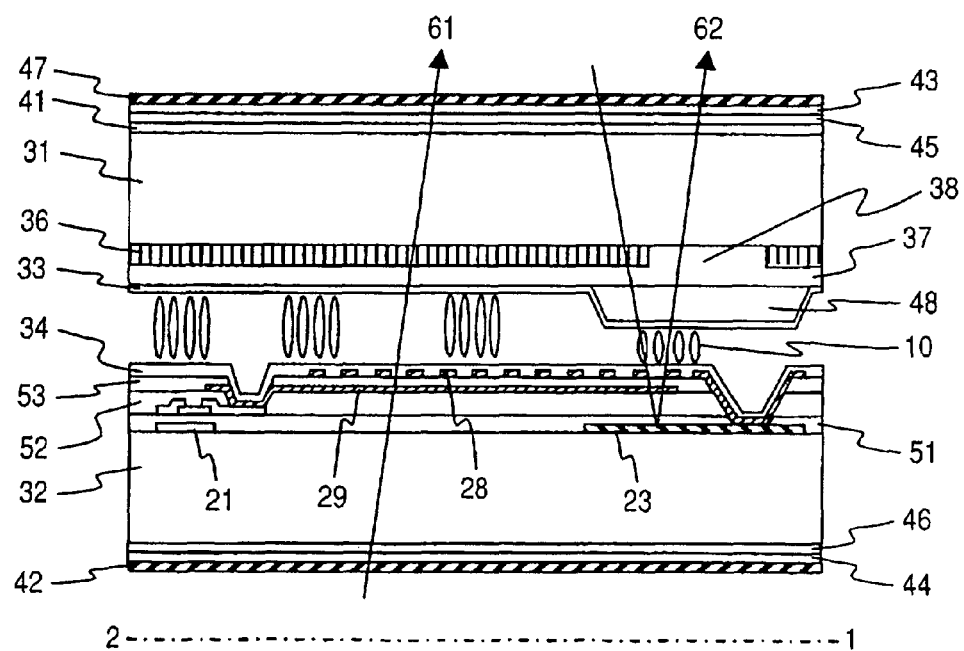

LIQUID CRYSTAL DISPLAY DEVICE WITH PIXEL ELECTRODE OR COMMON ELECTRODE HAVING SLIT LIKE APERTURE WITH INCREASING WIDTH

CLAIM OF PRIORITY

The present application claims priority from Japanese Application JP 2005-220533 filed on Jul. 29, 2005, the content of which is hereby incorporated by reference into this application.

BACKGROUND OF THE INVENTION

1. Field of the Invention

The present invention relates to a liquid crystal display device that divides a liquid crystal layer that is vertically aligned in multiple domains.

2. Description of the Related Art

Presently, a transmission type liquid crystal display device of a wide viewing angle such as an IPS (In Plane Switching) type or a VA (Vertical Alignment) type has been spread as a monitor, has improved the response characteristic, and has been used as a television. The liquid crystal display device for the television has been increasingly enlarged in the screen, and there is a case in which plural users watch the large-screen liquid crystal display device at the same time. Under the circumstances, it is desirable to provide the wide viewing angle display that is capable of obtaining substantially the same viewing performance as that in a normal direction even if the users watch the display from an oblique direction.

On the other hand, the liquid crystal display device has been also spread in a portable device including a cellular phone and a digital camera. The portable device is mainly privately used. In recent years, the liquid crystal display device having a display portion that is variable in the angle is increased. As a result, because there are many cases in which the user watches the liquid crystal display device from an oblique angle with respect to the normal direction of the display surface, the wide viewing angle display is desired.

Also, because the display device for the portable information device is used under the various environments from the outdoors in fine weather to the dark room, the transflective display device is desired. The transflective display device includes a reflective portion and a transmissive portion within one pixel. The reflective portion reflects a light that is inputted from the surroundings with the use of a reflector and conducts display. Therefore, because the contrast ratio is constant regardless of the brightness of the surroundings, the excellent display is obtained under the relative bright environments from the outdoors in fine weather to the dark room. The transmissive portion uses a back light, and the brightness is constant regardless of the surroundings. Therefore, the display of the high contrast ratio is displayed under the relative dark environments from the indoors to the dark room. The transflective type liquid crystal display device having both of the reflective portion and the transmissive portion is capable of obtaining the display of the high contrast ratio under the wide range environments from the outdoors in fine weather to the dark room.

The VA type liquid crystal display device is characterized in that retardation is 0 nm since a liquid crystal layer is vertically aligned at the time of applying no voltage, and the display of the high contrast ratio is relatively easily obtained when polarizers are disposed on the upper and lower surfaces of the liquid crystal layer in a cross nicol arrangement. In order to make the transflective VA type liquid crystal display device, a quarter wave plate or a laminated body consisting of a half wave plate and a quarter wave plate is disposed between each of the polarizers and the liquid crystal panel. In this case, the slow axis directions of the upper and lower quarter wave plates, or the upper and lower laminated bodies each consisting of the half wave plate and the quarter wave plate are made perpendicular to each other, to thereby relatively readily obtain the display of the high contrast ratio.

The VA type liquid crystal display device has suffered from such a problem that the gray scale reproductivity is deteriorated in the oblique direction. For example, in the case where an image having the gray scale such as a photograph is displayed and watched from the oblique direction, the brightness of the halftone is shifted to a higher tone side, and the image looks whitish. Also, in the VA type liquid crystal display device of the transflective type, since black display is also shifted to the higher tone side in addition to the halftone, the contrast ratio is deteriorated in addition to the excessively brightened image.

In the liquid crystal display device, display is conducted by using a change in the alignment state of the liquid crystal layer with application of an electric field, and a change in the optical characteristic with the change in the alignment state. The change in the alignment state of the liquid crystal layer is classified into two types consisting of a change in the rotation within a liquid crystal layer plane, and a change in a slope angle with respect to a direction perpendicular to the liquid crystal layer plane.

In the IPS type liquid crystal display system, the main change is the change in the rotation within the liquid crystal layer plane, and the change in the slope angle with respect to the direction perpendicular to the liquid crystal layer plane is small. On the contrary, in the VA type liquid crystal display device, the main change is the change in the slope angle of the liquid crystal layer, and the rotation within the liquid crystal layer plane is small.

Presently, the change in the alignment state of the VA type liquid crystal display device is similar to an ECB (Electrically Controlled Birefringence) type liquid crystal display device that is used in the transflective type liquid crystal display device. In the ECB type liquid crystal display device, because the slope direction of the liquid crystal layer at the time of applying the voltage is uniform, a liquid crystal polymer film whose single alignment direction is inclined is laminated on the ECB type liquid crystal display device in such a manner that the monocular alignment direction becomes perpendicular to the slope direction of the liquid crystal layer. As a result, the tone shift in the oblique direction can be compensated to some degree. On the other hand, the ECB type liquid crystal display device suffers from such a problem that the azimuth dependency of the viewing performance is large. This is caused by inclining the liquid crystal layer over the entire pixels in one direction at the time of applying a voltage as described above.

On the contrary, the VA type liquid crystal display device is characterized in that plural minute areas (domains) which are different in the liquid crystal alignment direction from each other at the time of applying the voltage are produced within the pixel, and this structure is called "multi-domain structure". The oblique characteristics of the individual domains are fundamentally equal to those of the liquid crystal layer of the ECB type liquid crystal display device, and are compensate between the respective domains, to thereby eliminate the azimuth dependency of the oblique characteristic. However, since the slope direction of the liquid crystal layer is not uniform, the tone shift eliminating method of the oblique direction using the liquid crystal polymer film such as the ECB type liquid crystal display device is not effected.

There has been known that it is preferable to give a distribution to the slope angle in order to reduce the toner shift in the oblique direction of the VA type liquid crystal display device. As the method of giving the distribution to the slope angle, there is, for example, a method of arranging two areas that are different in the transmittance-to-applied voltage characteristic within the pixel.

More particularly, a dielectric layer is partially disposed between the liquid crystal layer and the electrode, and a voltage value that is applied to the liquid crystal layer is partially changed within one pixel. Alternatively, two kinds of active switches which are different in the threshold voltage, and a pair of electrodes that are connected to those active switches, individually, constitute one pixel. Also, the same effect is obtained when two retention capacitors which are different in the capacitance from each other, and a pair of electrodes that is connected to the respective retention capacitors, individually, constitute one pixel.

However, since those methods are complicated in the pixel structure and insufficient in the distribution of the slope angle within one pixel, the tone shift in the oblique direction of the VA type liquid crystal display device is not sufficiently reduced.

Japanese Patent Laid-Open No. 2004-102001 discloses a liquid crystal display device in which a vertical electric field is applied to a liquid crystal layer with the use of a comb-like electrode that is so shaped as to be widened in a radial fashion from the center of one pixel to drive the liquid crystal display device. A pixel electrode and a common electrode are disposed in proximity to each other in the vicinity of the center of the radial comb-like electrode structure, and microscopic minimum processing dimensions are required to form the above structure. For example, in the case of the microscopic pixel corresponding to the high resolution display, there is a case in which the number of comb-like electrodes that can be arranged within one pixel is reduced, and the radial comb-like electrode structure cannot be formed. Also, the radial comb-like electrode structure may not be formed because the microscopic structure that is equal to or lower than the minimum machining dimensions is required in the vicinity of the center. In this case, the aperture ratio is deteriorated in the center of the pixel because no voltage can be applied to the liquid crystal layer, and it is predicted that the transmittance is deteriorated.

In the present invention, a voltage is applied to a liquid crystal layer that are vertically aligned with the use of a comb-like electrode of the IPS system. In the VA type liquid crystal liquid crystal display device, the voltage is applied to the liquid crystal layer with the use of the pair of electrodes that face each other through the liquid crystal layer. In this case, the electric field that is applied to the liquid crystal layer is substantially uniform over the entire pixel.

On the contrary, the electric field that is developed by the comb-like electrode is not uniform. When attention is paid to the respective portions viewed cross the comb-like electrode, for example, the center of the comb-like electrode, the center of the gaps of the comb-like electrode, and the end of the comb-like electrode, the electric field is different in the intensity and direction at the respective portions. Therefore, the alignment direction and the slope angle of the liquid crystal layer are different at the respective portions that cross the comb-like electrode.

The electric field direction is close to the normal direction at the end of the comb-like electrode. When the dielectric anisotropy of the liquid crystal layer is positive, the liquid crystal layer tries to be aligned in the direction of the line of electric force, a change in the alignment of the liquid crystal layer hardly occurs at the time of applying the voltage.

Also, when the dielectric anisotropy of the liquid crystal layer is positive, there are many cases in which the liquid crystal layer is going to change the alignment in the opposite direction at both ends of the comb-like electrode. The electric field does not exist in the center of the comb-like electrode even at the time of applying the voltage, and the liquid crystal layer in the center of the comb-like electrode changes the alignment in accordance with the elastic deformation that propagates from the liquid crystal layer in the vicinity of the comb electrode center. In this way, when the dielectric anisotropy of the liquid crystal layer is positive, there are many cases in which the elastic deformation is opposite in the direction to each other. In this case, the elastic deformation is balanced with each other in the center of the comb-like electrode, and no change in the alignment occurs.

On the contrary, because a sufficient change in the alignment occurs even at the end or the center of the comb-like electrode, the liquid crystal layer is made of a liquid crystal mixture that is negative in the dielectric anisotropy. In the case where the dielectric anisotropy is negative, the liquid crystal layer tries to be aligned in a direction perpendicular to the line of electric force, and because the degree of freedom of alignment is high, a change in the alignment is liable to occur. In this way, although the alignment state of the liquid crystal layer is different at the respective portions of the comb-like electrode, because the distribution range of the azimuth in the liquid crystal alignment direction is limited, the multi-domain structure is required even in the combination of the vertically aligned liquid crystal layer with the comb-like electrode.

First of all, when it is assumed that the change in the alignment of the liquid crystal layer is limited to in-plane that crosses the comb-like electrode, in the case where the interval of the comb-like electrodes is sufficiently narrow, a spray deformation of the liquid crystal layer becomes large at the time of applying the voltage. In order to alleviate the spray deformation of the liquid crystal layer, it is desirable that the alignment is changed in a direction perpendicular to a plane that crosses the comb-like electrode, that is, in a direction parallel to the comb-like electrode. However, there exist two directions that are in parallel to the comb-like electrode. When a change in the alignment in any one of those directions is made easier, a change in the alignment in a direction parallel to the comb-like electrode is liable to occur. That is, when two or more microscopic areas that are different from each other in a direction along which the change in the alignment is easy are formed within one pixel, the multi-domains can be conducted.

As a method of realizing the multi-domains, for example, there is a method in which a projection structure is arranged on the comb-like electrode or on its opposed electrode. The liquid crystal layer tries to be aligned to be perpendicular to the oblique surface of the projection in the vicinity of the projection structure. In addition, when the projection structure is shaped like a strip and distributed substantially perpendicularly to the comb teeth direction, the liquid crystal layer alignment that is in proximity to the projection structure is sloped in any one of directions that are in parallel to the comb-like electrode in a state where no voltage is applied. At the time of applying a voltage, the liquid crystal layer is liable to be sloped in a direction given by the projection structure, and the slope of the oblique surface is reversed with the center of the projection structure as the boundary. As a result, the slope direction of the liquid crystal layer is opposite to each other.

Also, the pitches of the comb-like electrode are continuously changed. In this case, one of the two directions which are in parallel to the comb-like electrode is reduced in the pitch, and the other direction is increased in the pitch. The line of electric force that is developed in the liquid crystal layer and the density of the line of electric force are changed according to the pitches of the comb-like electrode. The resultant change in the alignment of the liquid crystal layer is also changed according to the pitches of the comb-like electrode. Since two directions are not equal to each other, the slope in any one of those directions is eased, and the slope direction is determined. In other words, the comb-like electrodes within one pixel are divided into plural portions that are different from each other in a direction of increasing the pitches, thereby making it possible to form plural portions that are different from each other in the slope direction at the time of applying the voltage within one pixel.

In addition, in the case of the electrode structure in which the comb-like electrodes are concentrated to one point such as the radial structure, the common electrode and the pixel electrode are not formed on the same plane, but both of those electrodes are formed on planes that are different through the insulation layer. In this case, as compared with a case in which the common electrode and the pixel electrode are formed on the same plane, the density of the lines of electric force increases by double. As a result, even in the case where the number of comb-like electrodes which can be arranged within one pixel which is a microscopic pixel that deals with the high precision display, the implement is easy.

The voltage is applied to the liquid crystal layer that is vertically aligned by means of the comb-like electrode when the dielectric anisotropy is negative, and no voltage is applied with the result that a sufficient distribution occurs in the slope angle of the liquid crystal layer within one pixel. In addition, the projection structure is arranged on the opposed electrode, or the pitches of the comb-like electrode structure are continuously changed, thereby making it possible to provide the multi-domains.

As described above, there is obtained the liquid crystal display device that is excellent in the contrast ratio in the normal direction and the oblique direction, small in the azimuth dependency of the viewing performance, and small in the tone shift without deterioration of the gray scale reproductivity even in the oblique direction.

When the above liquid crystal display device is used for a liquid crystal television as the transmissive liquid crystal display device, there is obtained the display high in the contrast ratio with less excessive brightness and excellent in the gray scale reproductivity, even in the case where a large number of persons watch the liquid crystal television, and some of those persons watch the liquid crystal television from the oblique direction.

Also, in the transflective type liquid crystal display device in which the reflective portion and the transmissive portion are arranged within one pixel, there is obtained display that is high in the contrast ratio, excellent in the gray scale reproductivity, and has the wide viewing angle under the wide range of environments. When the above transflective type liquid crystal display device is used for a monitor of a cellular phone, a portable television, a digital steel camera, or a digital video camera, there is obtained display that is excellent in the visibility under the diverse environments from the outdoors in fine weather to the dark room.

BRIEF DESCRIPTION OF THE DRAWINGS

These and other objects and advantages of this invention will become more fully apparent from the following detailed description taken with the accompanying drawings in which:

FIGS. 19A and 19B are cross-sectional views showing the distribution of the lines of electric power at the time of applying a voltage in a liquid crystal display device according to a sixth embodiment;

FIG. 20 is a cross-sectional view showing the distribution of various lines and electrodes in a liquid crystal display device according to a seventh embodiment;

DETAILED DESCRIPTION OF THE PREFERRED EMBODIMENTS

Now, a description will be given of embodiments of the present invention with reference to the accompanying drawings.

First Embodiment

Figure 1:
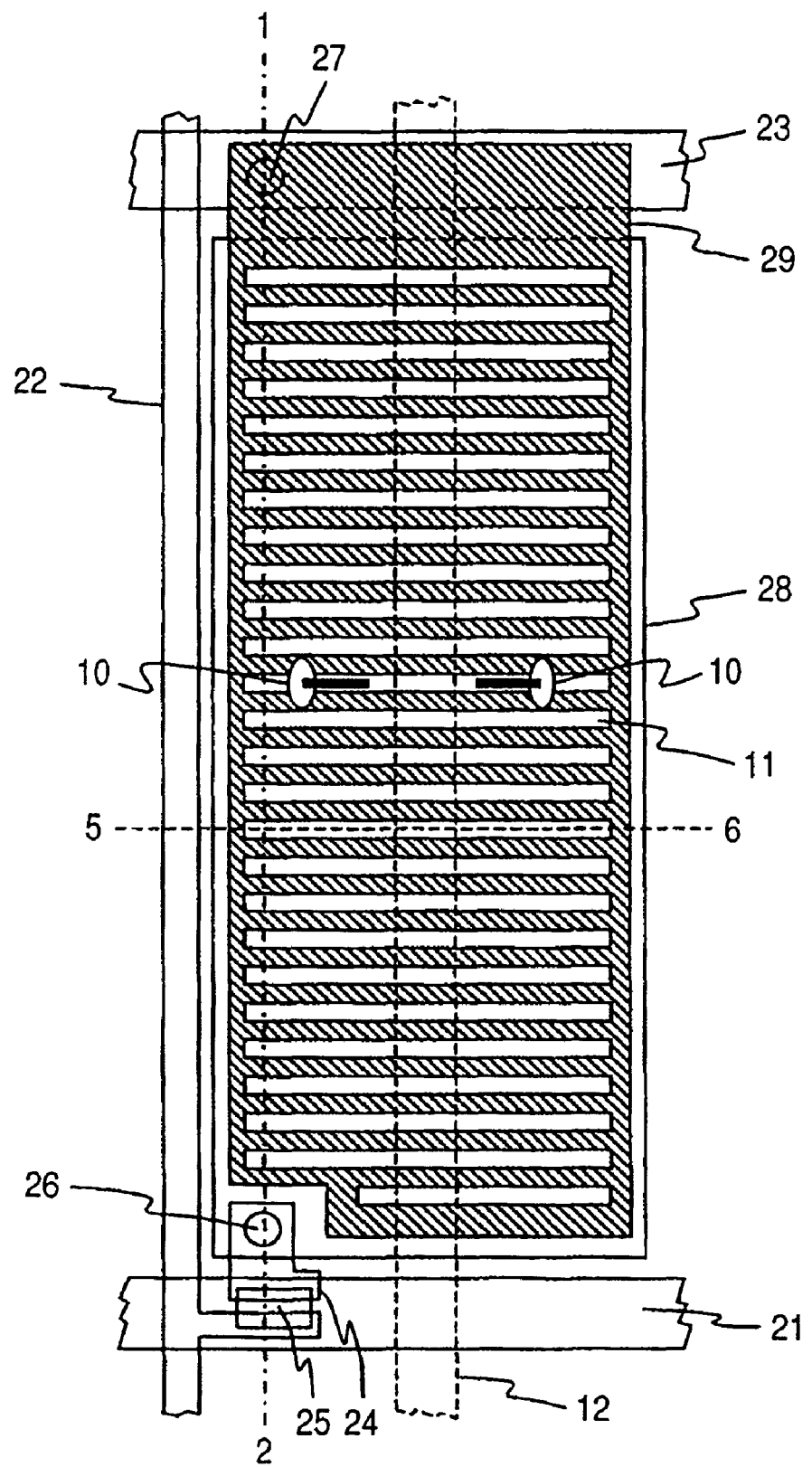
FIG. 1 is a plan distribution view showing an alignment control structure, and various lines and electrodes on a second substrate in a liquid display device according to a first embodiment.
Figure 2:
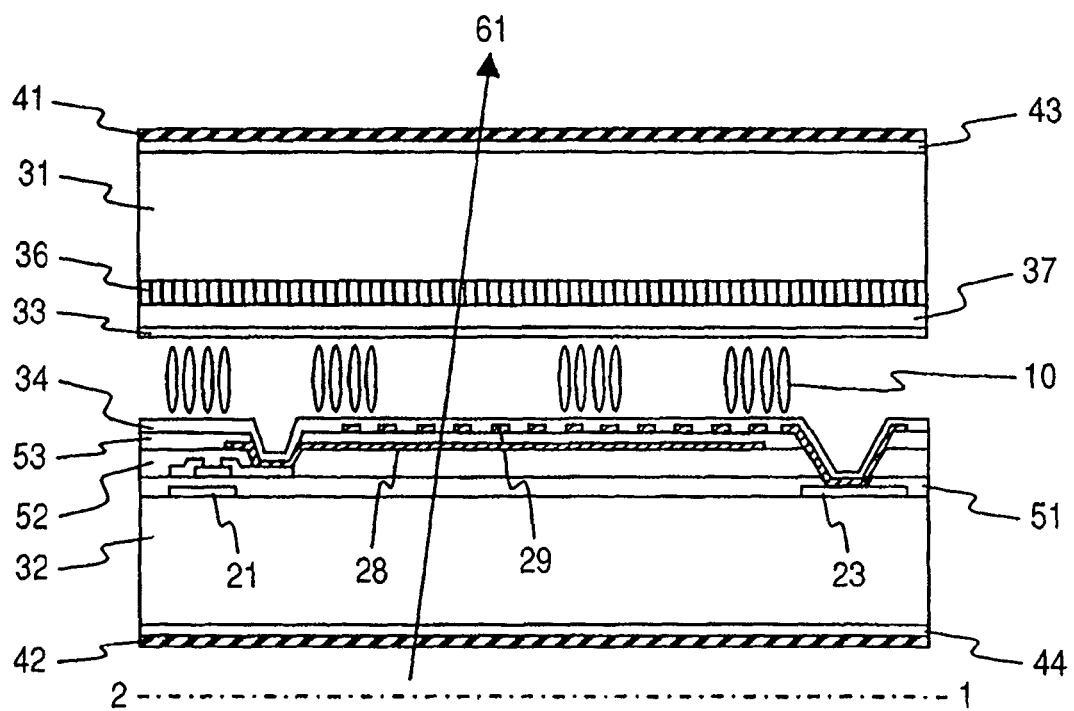
FIG. 2 is across-sectional view showing the distribution of the various lines and electrodes in the liquid crystal display device according to the first embodiment.

FIG. 2 shows a cross-sectional view of one pixel that constitutes a liquid crystal display device according to the present invention (a cross-sectional view taken along a chain line shown in FIG. 1), and FIG. 1 shows a top view of a second substrate 32 viewed from a normal direction. FIG. 1 mainly shows a plan distribution of a formation of the second substrate side 32. Only alignment control structure 12 indicated by a broken line is shown by the formation of a first substrate side 31. Also, FIG. 1 shows plural lines and plural electrodes. Because those lines and electrodes are not always flush, they are so distributed as to be partially overlapped with each other. One of those electrodes which is closest to a liquid crystal layer is hatched.

The liquid crystal display device according to the present invention mainly includes a first substrate 31, a liquid crystal layer 10, and a second substrate 32. The first substrate 31 and the second substrate 32 sandwich the liquid crystal layer 10. The first substrate 31 includes a color filter 36, a leveling layer 37, an alignment control structure 12, and a first alignment layer 33 at a side close to the liquid crystal layer 10. The second substrate 32 has a thin film transistor at a side close to the liquid crystal layer 10, and the thin film transistor is connected to a scanning line 21, a signal line 22, and a pixel electrode 28. The second substrate 32 also includes a common line 23 and a common electrode 29.

The thin film transistor is of an anti-staga structure, and its channel is formed by an amorphous silicon layer 25. A source electrode 24 connects the thin film transistor and the pixel electrode 28 The scanning line and the signal line 22 cross each other, and the thin film transistors are positioned substantially at the cross portion thereof. The common line 23 is distributed in parallel to the scanning line 21, and connected with the common electrode through a second contact hole 27. The pixel electrode 28 and the thin film transistor are coupled with each other by a first contact hole 26. A second alignment layer 34 is disposed on the common electrode 29, and is close to the liquid crystal layer 10 and regulates the alignment direction.

The first substrate 31 is made of borosilicate glass that is small in the amount of ionic impurities, and is 0.5 mm in the thickness. A color filter 36 has the respective portions of red, green, and blue repeatedly arranged in stripes. The stripes of the respective colors are disposed in parallel to the signal line 22. The asperity that is attributable to the color filter 36 is flattened by the leveling layer 37.

The alignment control structure 12 is formed of an organic polymer film, and its cross-sectional structure is of a quadratic curve or a triangle, and is projected from the leveling layer 37 toward the liquid crystal layer side. Also, the alignment control structure 12 is distributed in stripes, disposed in parallel to the signal line 22, and is distributed in the center of the respective color filters 36. The alignment control structure 12 is distributed in such a manner that each of the pixels is divided into substantially two equal parts along the longer side direction, when the first substrate 31 and the second substrate 32 are combined together.

The second substrate 32 is made of borosilicate glass as with the first substrate 31, and is 0.5 mm in the thickness. The second alignment layer 34 is formed of a polyimide organic film having the vertical alignment as with the first alignment layer 33. The signal line 22, the scanning line 21, and the common line 23 are made of chromium, and the common electrode 29 and the pixel electrode 28 are formed of transparent electrodes made of indium tin oxide (ITO), respectively.

The common electrode 29 has plural slits 11 in parallel to the scanning lines 21. The widths of the slits 11 and the widths between the slits are about 3 μm, respectively. The sum of the width of the slit and the width between the adjacent slits expresses the repetition cycle of the slit structure, and will be called "pitch" hereinafter.

The pixel electrode 28 and the common electrode 29 are separated from each other by a third insulation layer 53 that is 0.2 μm in the thickness. At the time of applying a voltage, an electric field is developed between the pixel electrode 28 and the common electrode 29, and the electric field is distorted to an arch configuration due to an influence of the third insulation layer 53, and then passes through the liquid crystal layer 10. With this action, a change in the alignment occurs in the liquid crystal layer 10 at the time of applying a voltage. Reference numeral 51 denotes a first insulation layer, and 52 is a second insulation layer.

When the thickness of the third insulation layer 53 changes in a range of from 0.1 μm to 0.5 μm, the intensity of the electric field that is developed in the liquid crystal layer 10 becomes higher as the thickness of the third insulation layer 53 becomes thinner. Also, the transmittance at the time of watching the display device at the same driving voltage increases more as the thickness of the third insulation layer 53 becomes thinner.

Also, when the thickness of the third insulation layer 53 is made thinner than 0.1 μm, the uniformity of the thickness is deteriorated. Taking both of those conditions into consideration, the optimum value of the thickness of the third insulation layer 53 is in a range of from about 0.1 μm to 0.2 μm of the lower limit of the study range.

The liquid crystal layer 10 is made of a liquid crystal mixture whose dielectric constant in the alignment direction exhibits the negative dielectric anisotropy that is smaller than a normal direction to the alignment direction. The birefringence is 0.095 at 25° C. and 633 nm in the wavelength, and the liquid crystal layer 10 exhibits a nematic phase in a wide temperature range including a room temperature zone. Also, the liquid crystal layer 10 exhibits a high resistance to the degree that sufficiently holds the transmittance during a holding period under the driving conditions using the thin film transistor, for example, when the number of scanning lines is 800, and the driving frequency is 60 Hz.

The driving voltage can be reduced with the use of a liquid crystal material whose absolute value of the dielectric anisotropy is larger. On the other hand, the liquid crystal material whose dielectric anisotropy is negative tends to increase the viscous modulus together with the absolute value of the dielectric anisotropy. The response characteristic is deteriorated with the use of a liquid crystal material that is large in the viscous modulus.

When the applied voltage value of the respective pixels increases, if a voltage value that is higher than a new voltage value is temporarily applied, it is possible to accelerate a change in the alignment of the liquid crystal layer and improve the response characteristic. This driving method is called "overdrive". For example, the overdrive is put into practice, thereby making it possible to reduce the deterioration of the response characteristic which is attributable to the liquid crystal material.

The first alignment layer 33 and the second alignment layer 34 are formed of polyimide organic polymer films, respectively, and formed by coating a mixed solution consisting of acid anhydride and diamine, and heating and firing the mixed solution. The polyimide organic polymer film has a polymer main chain as well as a side chain structure which is made of alkyl group, and has a property that aligns the liquid crystal layer vertically with respect to the film surface.

After the formation of the first alignment layer 33 and the second alignment layer 34, the first substrate 31 and the second substrate 32 are combined together, and the liquid crystal composition is sealed to form the liquid crystal layer 10.

A columnar spacer is formed in the pixel gap on the second substrate 32, 20 μm in the diameter and 4.5 μm in the height. The thickness of the liquid crystal layer is uniformed by the columnar spacer and set to about 4.5 μm over the entire display portion. The Δnd of the liquid crystal layer is 428 nm at 25° C.

A first upper phase plate 43 and a first lower phase plate 44 are arranged on the upper and lower surfaces of the first substrate 31 and the second substrate 32, respectively. The first upper phase plate 43 and the first lower phase plate 44 are made of triacetyl cellulose. When it is assumed that the refractive index of the in-plain in the slow axial direction is nx, the refractive index of the in-plain in the fast axial direction is ny, and the refractive index in the thickness direction is nz, a difference between nx and ny is small, but a difference between nx and nz is large, and nx>nz. That is, the first upper phase plate 43 and the first lower phase plate 44 have the feature of a so-called negative C plate (negative refractive anisotropic medium). When the retardation Rth is expressed by $[0.5(nx+ny)-nz]d$ using nx, ny, nz, and the layer thickness d, Rth of about 100 nm is used for the first upper phase plate 43 and the first lower phase plate 44.

The liquid crystal layer at the time of applying no voltage is vertically aligned, and its refractive index is large in the alignment direction. Therefore, the liquid crystal layer has the feature equivalent to that of the positive C plate.

The liquid crystal layer 10 having the same oblique characteristic as that of the positive C plate is combined with the first upper phase plate 43 and the first lower phase plate 44 for the negative C plate, to thereby compensate the oblique characteristic of the liquid crystal layer in the dark display, and improve the oblique characteristic of the dark displace.

A first polarizer 41 and a second polarizer 42 are disposed on the upper and lower surfaces of the first upper phase plate 43 and the first lower phase plate 44, respectively. The first polarizer 41 and the second polarizer 42 are produced by extending polyvinylalcohol organic polymer containing iodine therein, and have an absorption axis in the extending direction, respectively.

The absorption axial directions of the first polarizer 41 and the second polarizer 42 are so disposed as to be orthogonal to each other, and the slow axes of the first phase plate 43 and the second phase plate 44 are so disposed as to be in parallel to the absorption axes of the first polarizer 41 and the second polarizer 42.

At the time of applying no voltage, most of the liquid crystal layer 10 in one pixel is vertically aligned, and the absorption axes of the first polarizer 41 and the second polarizer 42 are positioned orthogonally, to thereby minimize the transmittance at the time of applying no voltage. Reference numeral 61 denotes a transmission light.

Figure 3A:
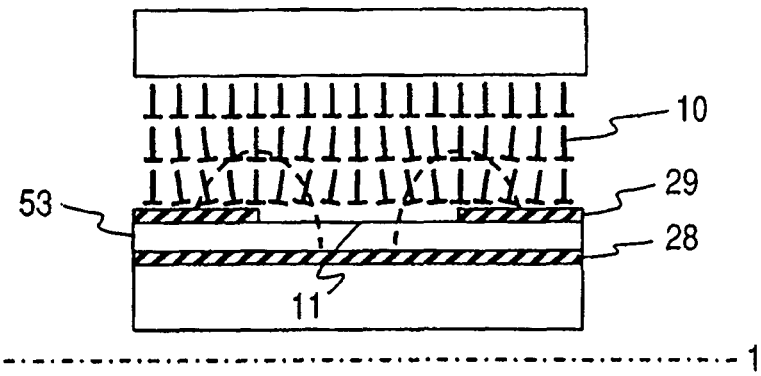
FIGS. 3A to 3C are diagrams showing a change in liquid crystal alignment in a direction perpendicular to the slit at the time of applying a voltage to the liquid crystal display device according to the first embodiment.
Figure 3B:
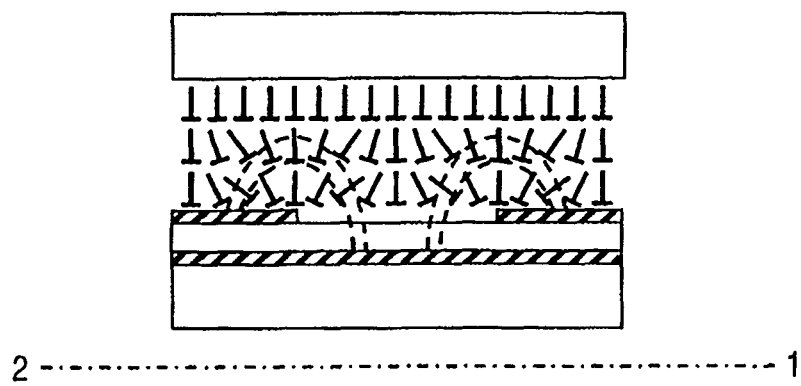
Figure 3C:
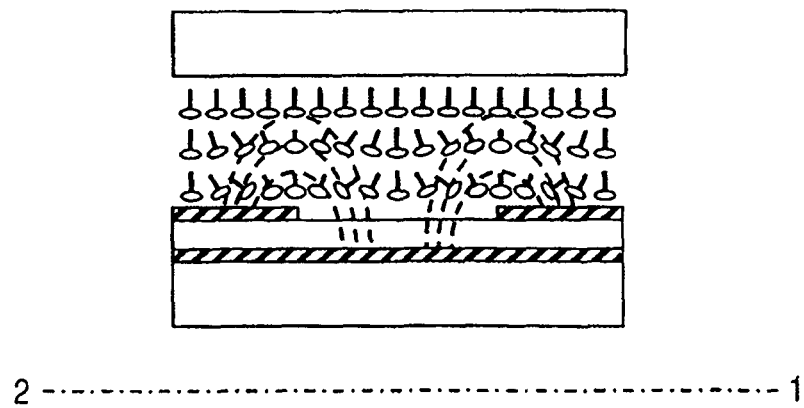

FIG. 3 is a cross-sectional view taken along a direction that crosses the slit 11 within one pixel shown in FIG. 1 (a partial cross-sectional view taken along a chain line 1-2 shown in FIG. 1), and shows the alignment state of the liquid crystal layer 10 in a portion that is sufficiently apart from the alignment control structure 12. In the case of expressing the three-dimensional alignment of the liquid crystal layer as shown in FIGS. 3A to 3C, 4A to 4C, and 5A to 5C, the local alignments of the liquid crystal layer are indicated by nail marks.

The arch electric field is developed in the liquid crystal layer 10 at the time of applying a voltage. In the case where the electric field is weak, a change in the alignment mainly occurs in a boundary portion (slit boundary portion) of the slit 11 and the common electrode 28, as shown in FIG. 3A, and the alignment remain vertical in the center of the slit 11 and in the center of the common electrode 29.

Because the slope of the liquid crystal layer 10 on the slit boundary portion occurs within the cross-section of FIG. 3A, and the slope directions become reversed on the close slit boundary portion, a spray deformation occurs in the liquid crystal layer 10. In the case where the electric field is high, the spray deformation becomes large as shown in FIG. 3B.

In the case where the electric field is further higher, in order to relieve the electric field, as shown in FIG. 3C, the entire liquid crystal layer 10 including the center of the slit and the center of the common electrode is sloped toward the slit direction, that is, toward a direction perpendicular to the cross section of FIG. 3.

Figure 4A:
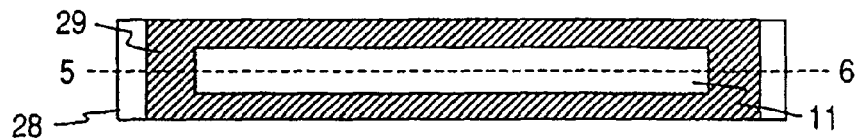
FIGS. 4A to 4C are diagrams showing a change in liquid crystal alignment in a direction parallel to the slit in the case where no alignment control structure is disposed in the liquid crystal display device according to the first embodiment.
Figure 4B:
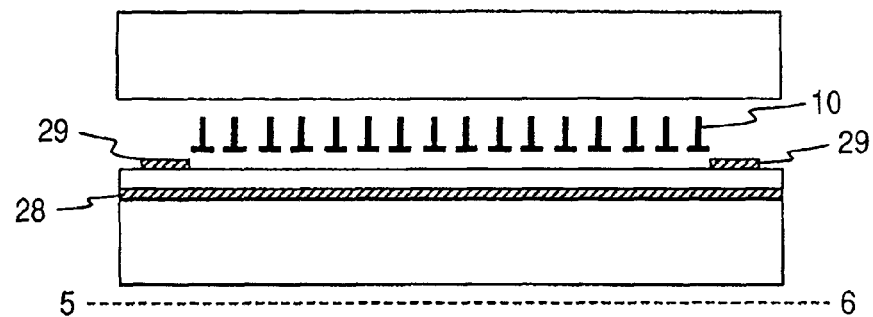
Figure 4C:
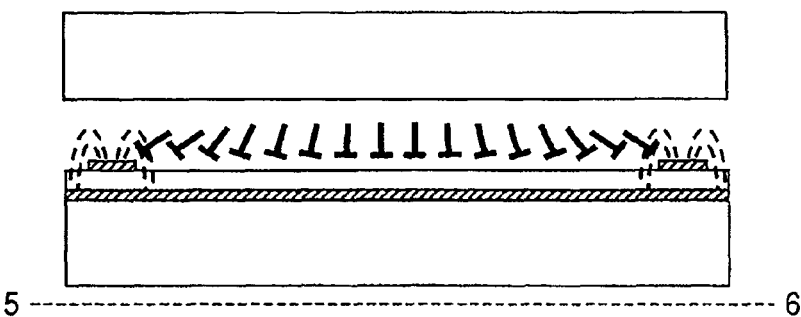

FIGS. 4A to 4C shows the liquid crystal alignment control by means of the common electrode 29 and the pixel electrode 28 from which the alignment control structure 12 is omitted. FIG. 4A shows the partial extraction of the repetition structure which is produced by the common electrode 29 and the pixel electrode 28 shown in FIG. 1, which includes one slit 11.

FIGS. 4B and 4C are cross-sections taken along a dotted line 5-6 of FIG. 4A, which are perpendicular to FIG. 3. FIG. 4B shows the alignment state at the time of applying no voltage, and the liquid crystal layer is vertically aligned since a case having no alignment control structure 12 is assumed.

FIG. 4C shows the alignment state at the time of applying a voltage, and the arch lines of electric force are developed at the slit end. Also, although not shown in FIG. 4C, the lines of electric force are developed between the common electrode that is in parallel to the surface of FIG. 4C and the pixel electrode 28 that is a lower layer of the common electrode as shown in FIG. 3B. A spray deformation is produced in the liquid crystal layer 10 in a direction perpendicular to the surface of FIG. 4C.

In order to relieve the spray deformation, with the lines of electric force at the slit end as a turning point, the liquid crystal layer 10 is sloped from both ends of the slit 11 toward the center of the slit 11 along the slit 11.

Figure 5A:
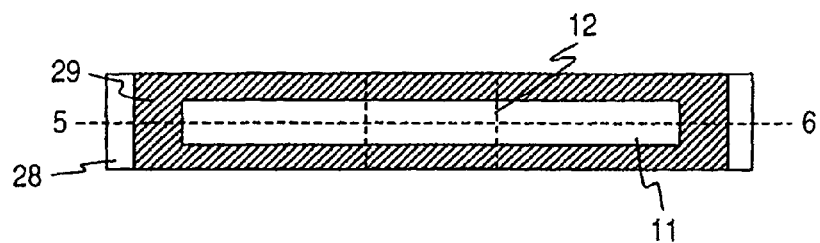
FIGS. 5A to 5C are diagrams showing a change in the liquid crystal alignment in a direction parallel to the slit in the case where the alignment control structure is disposed in the liquid crystal display device according to the first embodiment.
Figure 5B:
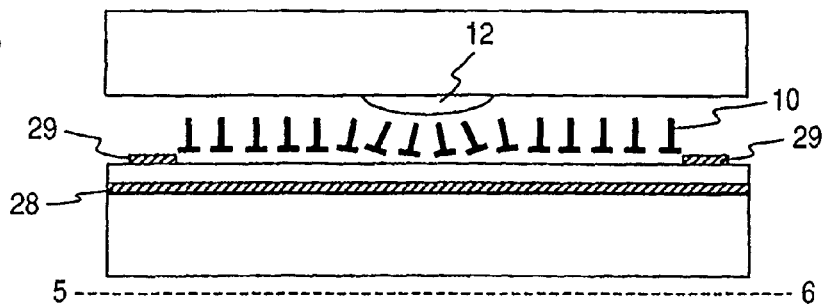
Figure 5C:
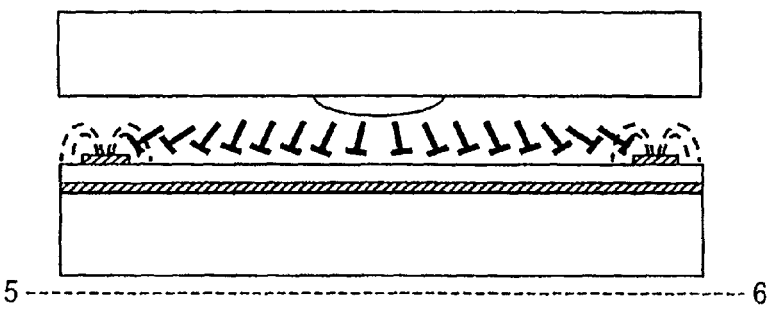

FIGS. 5A to 5C show the liquid crystal alignment control due to the alignment control structure 12, and as shown in FIG. 5B, because the liquid crystal layer 10 is sloped vertically with respect to the slope surface of the alignment control structure 12 at the time of applying no voltage, the liquid crystal layer 10 is sloped with respect to the layer thickness direction and aligned in the vicinity of the alignment control structure 12.

Because the alignment control structure 12 is positioned in the center of the slit 11, the slope direction is identical with the liquid crystal alignment direction due to the lines of electric force at the slit end shown in FIG. 4C. At the time of applying a voltage, as shown in FIG. 5C, the advantage of promoting the liquid crystal alignment due to the lines of electric force at the slit end is exhibited as shown in FIG. 5C.

As shown in FIG. 4C, because the center of slit is far from the slit end, the liquid crystal alignment due to the lines of electric force at the slit end is difficult to diffuse to the center of slit. However, the existence of the alignment control structure 12 makes the liquid crystal alignment between the slit end and the center of slit more uniform, and the liquid crystal alignment at the time of applying a voltage is more stabilized.

As described above, the lines of electric force which are developed by the common electrode 29 and the pixel electrode 28 and the alignment control of the alignment control structure 12 is promoted together, to thereby stabilize the slope directions of the liquid crystal layer 10 to be opposite to each other at both sides of the center of the slit 11.

As described above, the liquid crystal layer 10 within one pixel is divided into two domains with the alignment control structure 12 as a boundary.

Figure 6:
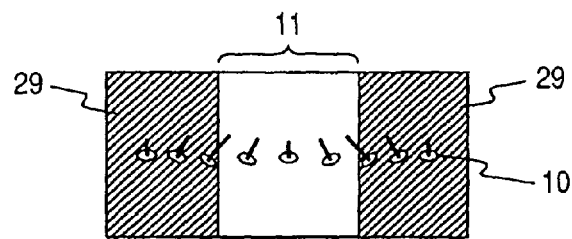
FIG. 6 is a plan view showing a liquid crystal alignment state at the time of applying a voltage to the liquid crystal display device according to the first embodiment, viewed from a direction normal to a substrate.

Attention is again paid to the liquid crystal alignment direction within the respective domains. FIG. 6 shows the liquid crystal alignment direction on the slit boundary portion viewed from a direction normal to the substrate. When a sufficient voltage is applied between the common electrode 29 and the pixel electrode 28, and the liquid crystal layer is sloped in the slit direction, the spray deformation shown in FIG. 3B is relieved. In this situation, the spray deformation is not perfectly relieved and aligned in parallel, but the slight spray deformation remains. As a result, as shown in FIG. 6, the liquid crystal alignment directions are partially directed toward the oblique direction with respect to the slit direction, and the liquid crystal alignment directions at the ends of the adjacent slits are symmetric with respect to the slit direction.

Since two portions that are different in the slope direction exist within one domain, the effect of averaging the azimuth dependency of the viewing performance in this embodiment is substantially identical with that in the case where one pixel is divided into four domains.

A white light plane light source is disposed in the background, and the viewing performance due to the transmission light is observed. The viewing performance is excellent in the contrast ratio and the halftone reproductivity in the direction normal to the substrate, and there is no case in which the contrast ratio and the halftone reproductivity are largely deteriorated even in a direction sloped with respect to the direction normal to the substrate. Also, there is no case in which the halftone reproductivity is largely deteriorated even in any azimuth.

Second Embodiment

In the first embodiment, as shown in FIG. 1, the alignment control structure 12 is disposed in parallel to the longer side direction of one pixel. In this case, a distance between the alignment control structure 12 and the liquid crystal layer within a pixel which is farthest from the alignment control structure 12, that is, the liquid crystal layer at the end of the pixel which is close to the signal line 22 is short, and the liquid crystal alignment control effect due to the alignment control structure 12 is liable to be influenced on one entire pixel.

Figure 7:
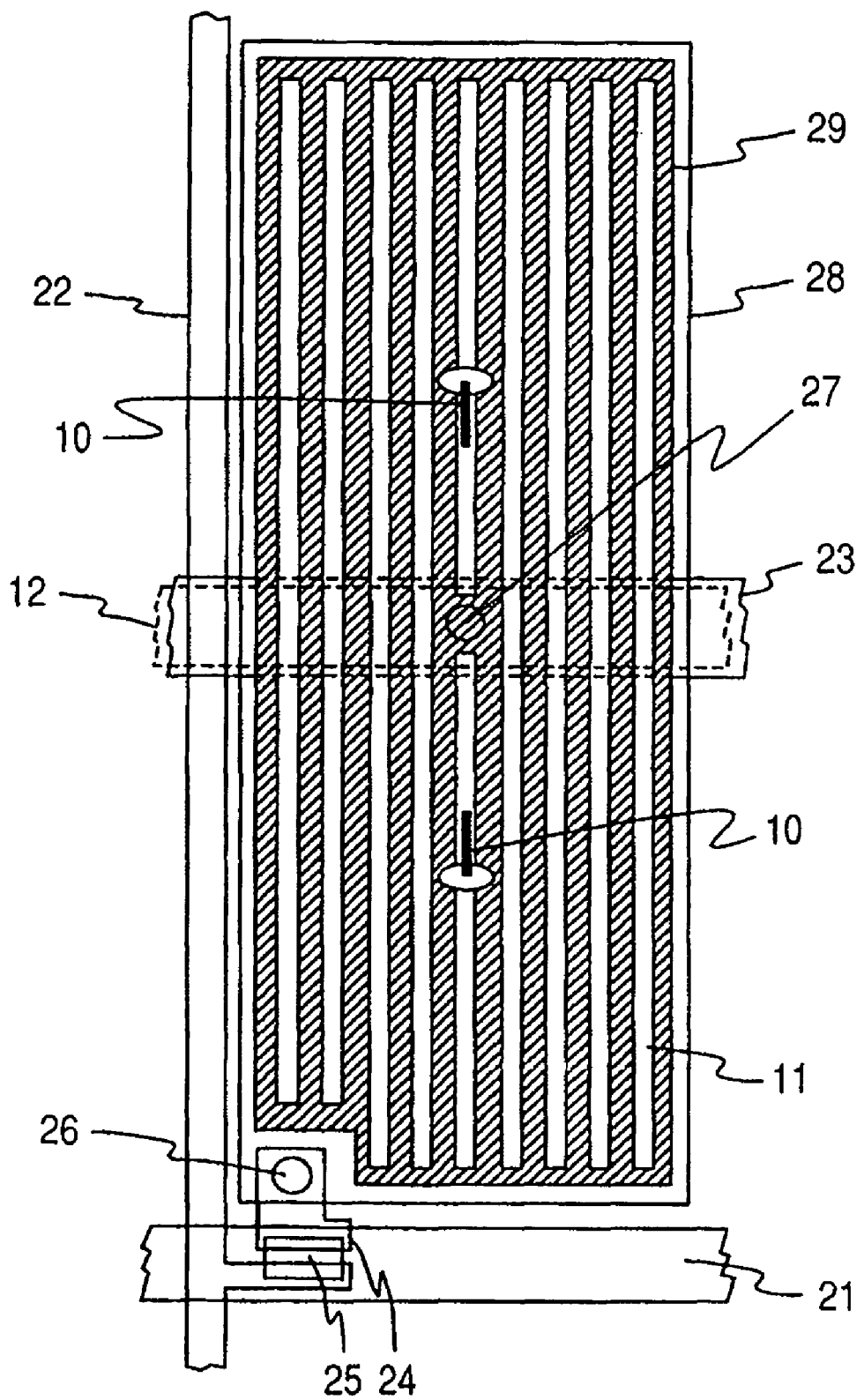
FIG. 7 is a plan distribution view showing an alignment control structure, and various lines and electrodes on a second substrate in a liquid display device according to a second embodiment.

On the contrary, in this embodiment, as shown in FIG. 7, the boundary of two domains is disposed in parallel to the shorter side direction of one pixel. More specifically, the direction of the slits 11 is set to be in parallel to the signal line 22, and the alignment control structure 12 is disposed in parallel to the scanning line 21, and passes through the center of one pixel. Even in this case, the same oblique characteristic as that of the first embodiment is obtained.

Also, in this embodiment, since the length of the alignment control structure 12 is equal to the shorter side of the pixel, the length of the alignment control structure 12 is shorter than that in the first embodiment. In the vicinity of the alignment control structure 12, Δnd of the liquid crystal layer is not 0 nm because the liquid crystal monocle is aligned obliquely with respect to the direction normal to the substrate at the time of applying no voltage.

In a state where Δnd of the liquid crystal layer is 0 nm, the first polarizer 41 and the second polarizer 42 are disposed orthogonally so as to minimize the transmittance. However, because Δnd of the liquid crystal layer is not 0 nm in the alignment control structure 12 and a portion in the vicinity of the alignment control structure 12, the transmittance is not minimized.

In order to reduce the transmittance of the dark display and obtain the high contrast, it is first proposed that the alignment control structure 12 and a portion in the vicinity thereof are shielded by a black matrix or a metal layer of the same layer as that of the diverse lines. However, there occurs an adverse reaction that the transmittance of the bright display is reduced.

In this embodiment, because the alignment control structure 12 is shortened as compared with the first embodiment, even if the alignment control structure 12 and a portion in the vicinity thereof are shielded by a black matrix or the like, it is possible to suppress a reduction in the transmittance of the bright display at the minimum.

Third Embodiment

Figure 8:
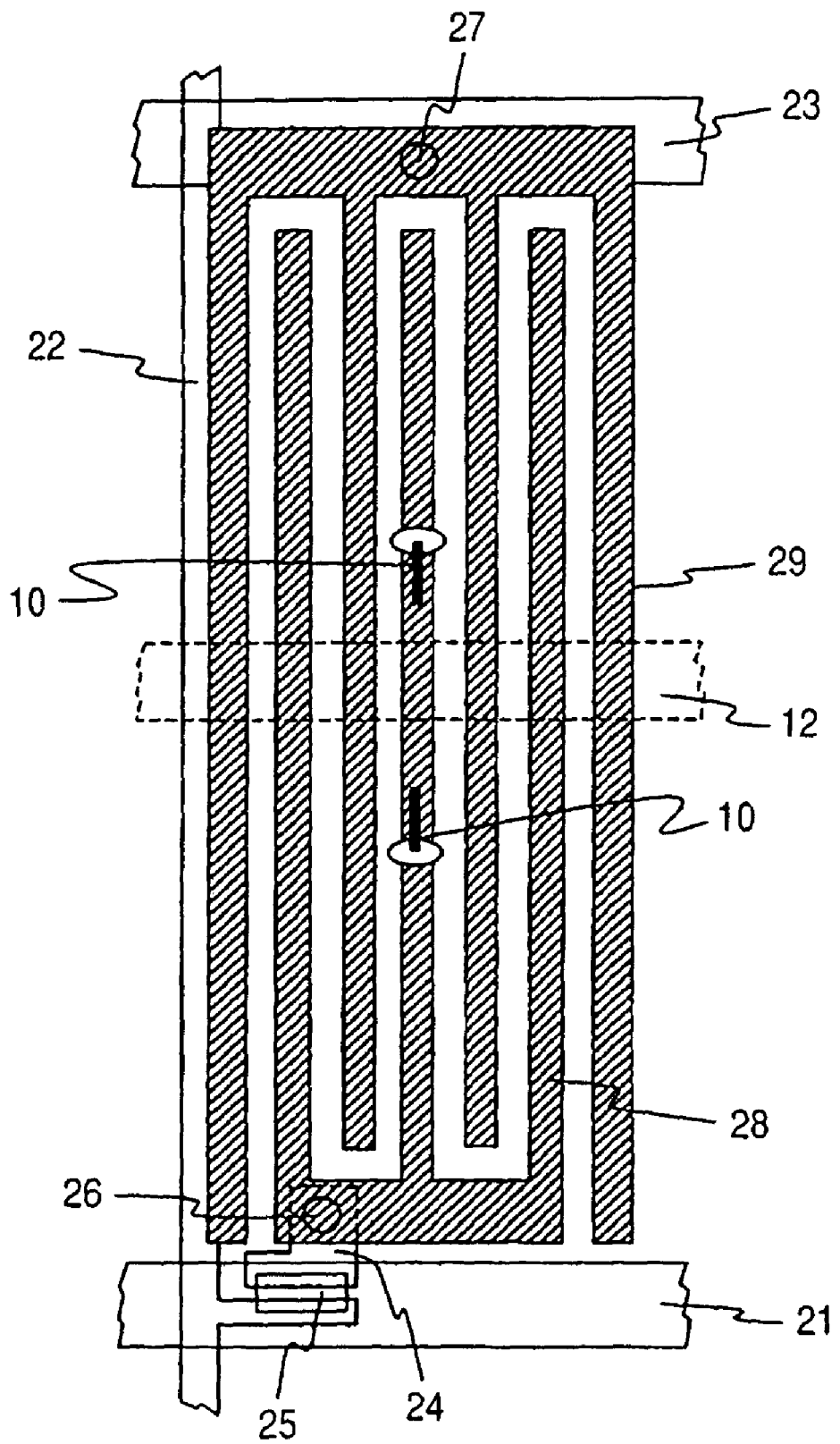
FIG. 8 is a plan distribution view showing an alignment control structure, and various lines and electrodes on a second substrate in a liquid display device according to a third embodiment.

In this embodiment, both of the common electrode 29 and the pixel electrode 28 are of the comb-like planar structure, and formed in the same layer. FIG. 8 shows a plan structure of one pixel of the liquid crystal display device according to this embodiment. The pixel electrode 28 is hatched as with the common electrode 29, and its comb-like structure is disposed in parallel to the signal line 22.

The common electrode 29 is disposed in the vicinity of the signal line 22, and has a function of shielding the signal line potential. A surface of the first substrate 31 in proximity to the liquid crystal layer 10 disposes the alignment control structure 12. The alignment control structure 12 is of the stripe-like plan structure as in the second embodiment, and the stripe is disposed in parallel to the scanning line 21, and distributed so as to divide one pixel into two equal parts. The lines of electric force are formed in an arch between the common electrode 29 and the pixel electrode 28 at the time of applying a voltage.

Different from the first embodiment and the second embodiment, because no insulation layer is interposed between the common electrode 29 and the pixel electrode 28, the lines of electric force are compared with those electrodes, and extend up to an area that is more apart from a surface where the common electrode 29 exists, and can effectively drive the wider area of the liquid crystal layer 10 in the layer thickness direction.

The liquid crystal material whose dielectric anisotropy is negative is small in the diversity of Δnd as compared with the positive liquid crystal material, and a value close to 0.1. For that reason, in order to increase the Δnd of the liquid crystal layer 10, the liquid crystal layer 10 must be thickened. However, when a distance of the lines of electric force in the thickness direction is small, even if the liquid crystal layer 10 is thickened, the thickness of the liquid crystal layer 10 that can be driven by the electric field remains constant, and the effective Δnd is not increased.

In this embodiment, since the area to which the lines of electric force are extended is widened in the layer thickness direction, the effective Δnd of the liquid crystal layer 10 can be increased even in the case where the thickness of the liquid crystal layer is increased. Since a change in the Δnd is increased at the time of applying a voltage, the advantage of increasing the transmittance is obtained.

Fourth Embodiment

Figure 9:
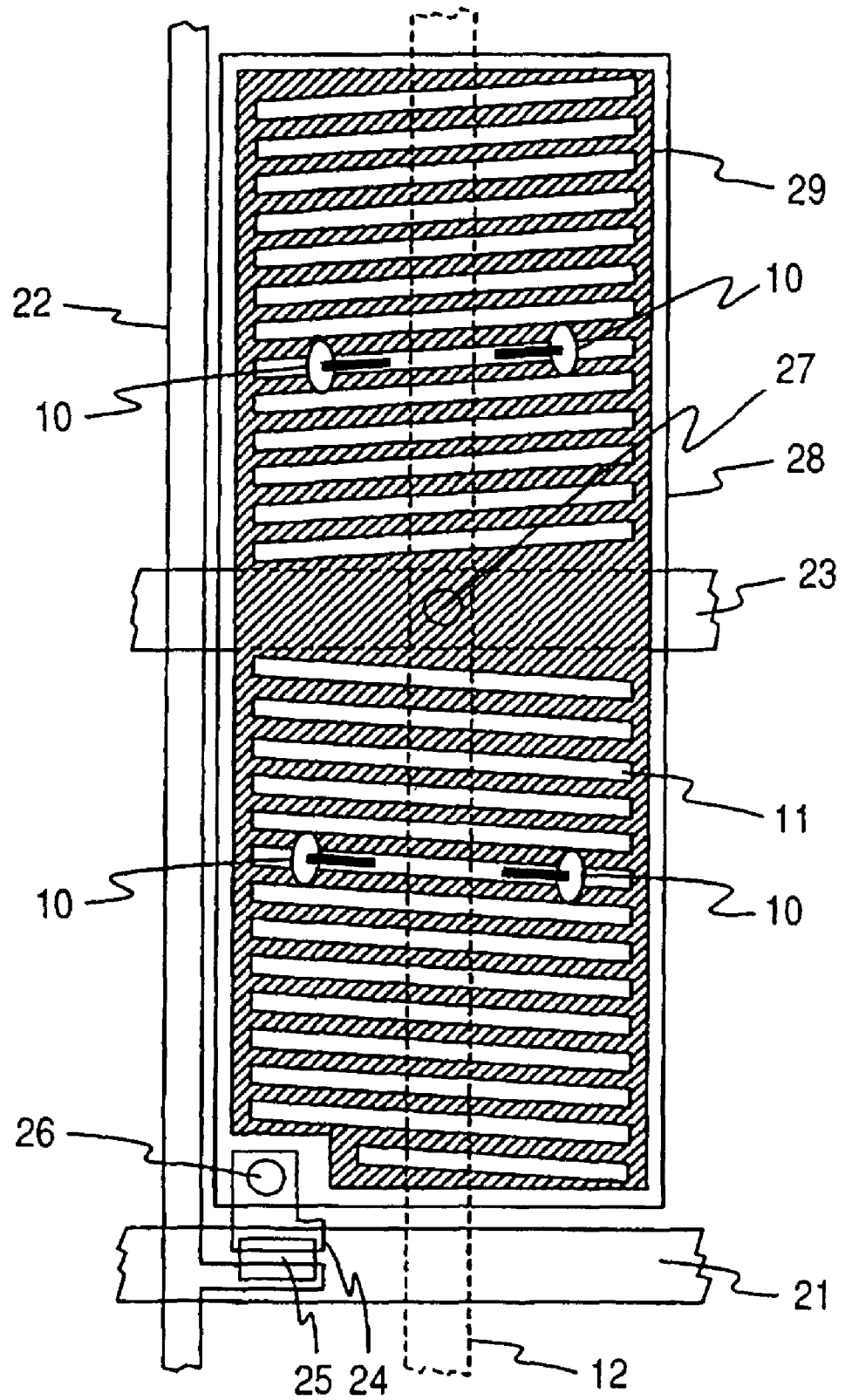
FIG. 9 is a plan distribution view showing an alignment control structure, and various lines and electrodes on a second substrate in a liquid display device according to a fourth embodiment.

In this embodiment, the number of domains of the liquid crystal layer at the time of applying a voltage increases to four, the azimuth dependency of the oblique characteristic is uniformed. FIG. 9 shows a plan structure of one pixel in the liquid crystal display device according to this embodiment, and the common line 23 passes through the center of the pixel, and the directions of the slits 11 are different above and below the common line 23.

Because the direction of the slits 11 is divided into two directions within one pixel, and the alignment control structure 12 divides those directions into two, respectively, the number of domains of the liquid crystal layer at the time of applying a voltage can be increased to four.

Figure 10:
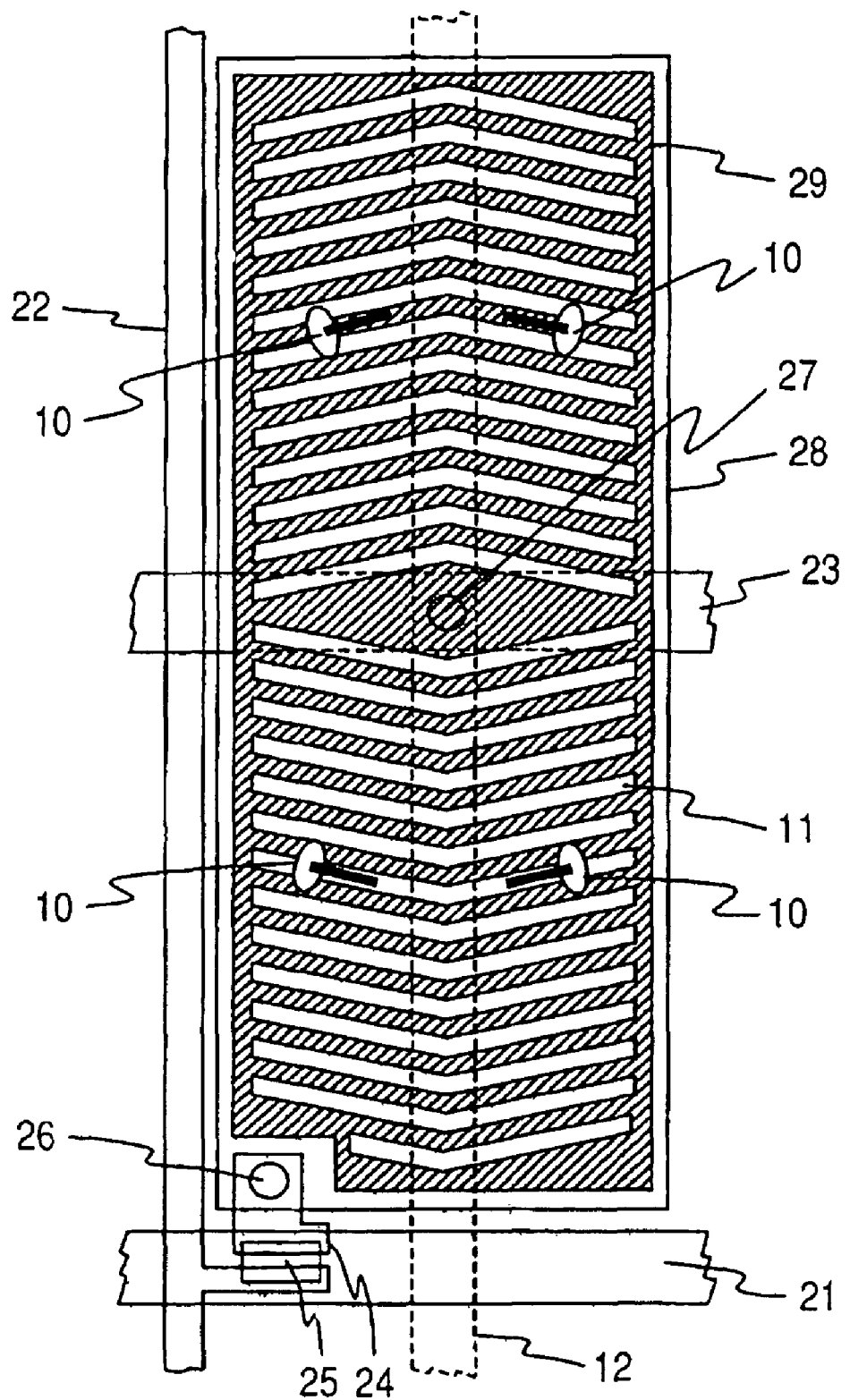
FIG. 10 is a plan distribution view showing the alignment control structure, and the various lines and electrodes on the second substrate in the liquid display device according to the fourth embodiment.

Also, FIG. 10 shows another example of the plan structure in one pixel, and the slits 11 are V-shaped, and the alignment control structure 12 is distributed at the bent portions of the slits 11. The common line 23 passes through the center of the pixel, and the direction of the slits 11 is reversed above and below the alignment control structure 12. The number of domains of the liquid crystal layer at the time of applying a voltage can be increased to four in the same manner as that in the case of the pixel structure shown in FIG. 9.

As a result of observing the viewing performance while changing the azimuth of the observing direction, a change in the viewing performance with the change in the azimuth is hardly detected. Thus, the number of domains of the liquid crystal layer at the time of applying a voltage can be increased to four, thereby making it possible to reduce the azimuth dependency of the viewing performance.

Fifth Embodiment

In this embodiment, the liquid crystal layer at the time of applying a voltage is divided into multi-domains without using the alignment control structure 12. In the above embodiments, the slits 11 of the common line 29 are constant in the pitch over the entire pixel. However, in this embodiment, as shown in FIG. 11, a continuous change is given to the pitch of the slits 11, and the pitch is broadest at one end of the pixel, and narrowest at the other end of the pixel.

Figure 11:
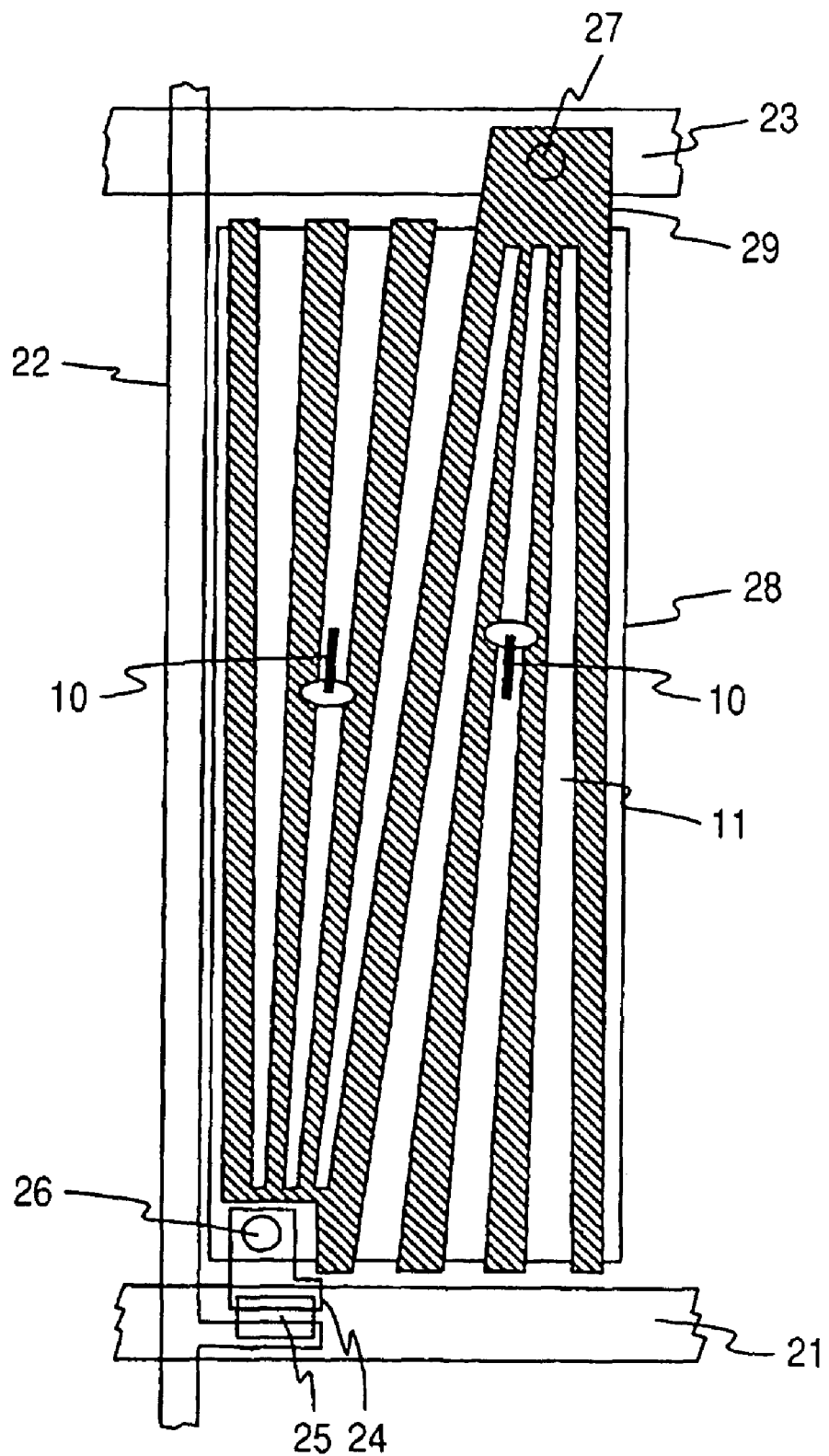
FIG. 11 is a plan distribution view showing an alignment control structure, and various lines and electrodes on a second substrate in a liquid display device according to a fifth embodiment.

FIG. 11 shows a pixel structure in the case where two domains are formed within one pixel, and because the pitches of the slits 11 are continuously changed, the assembly of the slits 11 and the drains of the liquid crystal layer 10 corresponding to the assembly are trapezoidal or arc when observed from the direction normal to the substrate.

Figure 12A:
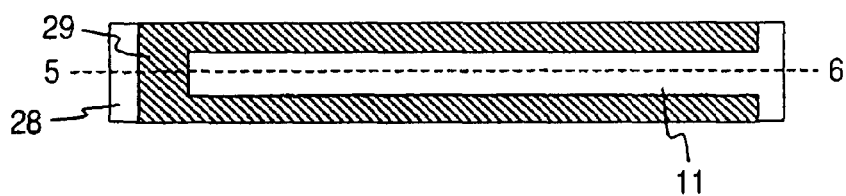
FIGS. 12A and 12B are diagrams showing an alignment control method in the liquid crystal display device according to the fifth embodiment.
Figure 12B:
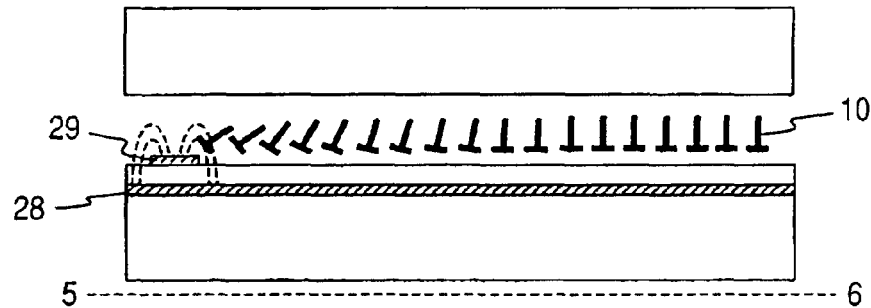

In the description of the liquid crystal alignment control in this embodiment, the basic structure shown in FIGS. 12A and 12B will be first described. In the basic structure shown in FIGS. 4A to 4C, the slits 11 are included in the common electrode 29. However, in FIG. 12A, the slits 11 penetrate in the right direction, and the common electrode 29 is comb-shaped. For that reason, in the cross-section shown in FIG. 12B in the center of the slits 11, no common electrode 29 exists at the right end, and only the common electrode 29 at the left end affects the liquid crystal layer, and the slits 11 are sloped and aligned in only one direction. However, unless a voltage is sufficiently applied, the slope alignment is not spread up to the right end of the slits 11.

Figure 13A:
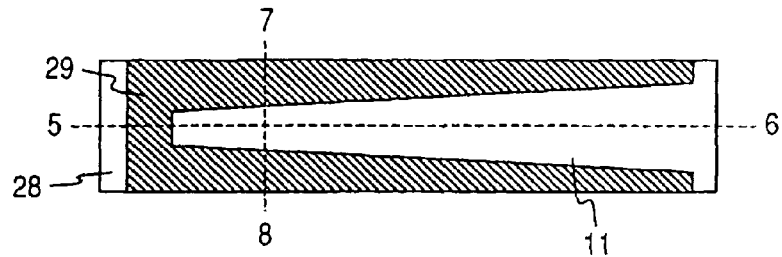
FIGS. 13A to 13C are diagrams showing the alignment control structure and the alignment control method in the liquid display device according to the fifth embodiment.
Figure 13B:
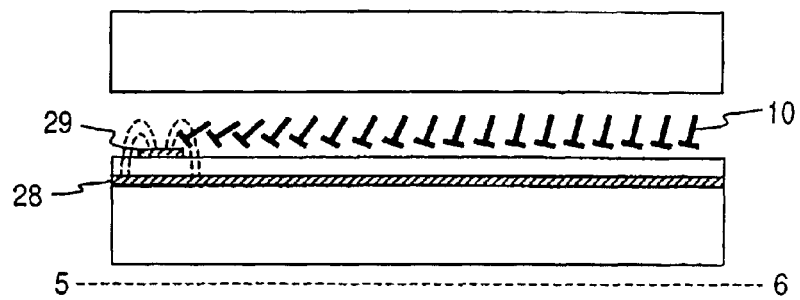

Also, FIG. 13A shows the partial extraction of the repetition structure which is produced by the common electrode 29 and the pixel electrode 28 according to this embodiment shown in FIG. 11, which includes one slit 11. FIG. 13B is identical with FIG. 12B.

Figure 13C:
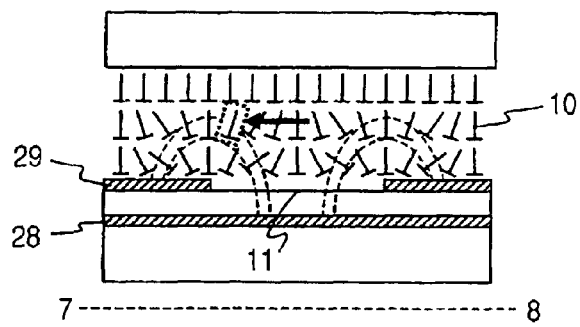

FIG. 13C is a cross-sectional view taken along a direction that crosses the slits 11 as indicated by a dotted line 4-8 in FIG. 13A. Although the spray deformation occurs, a voltage is applied to the degree that does not produce the slope in the slit direction.

Figure 14A:
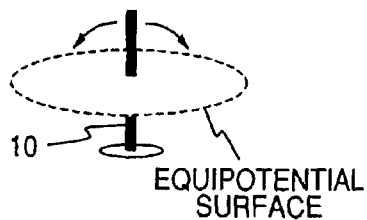
FIGS. 14A and 14B are diagrams showing the alignment control method in the liquid display device according to the fifth embodiment.
Figure 14B:
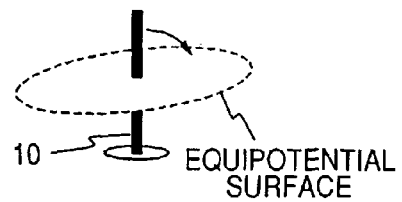

The local liquid crystal alignment of a portion (on the slits 11) where no common electrode 29 exists in FIG. 13C is surrounded by a square indicated by broken lines, to which attention is paid. FIG. 14B shows the liquid crystal alignment when observed from a direction indicated by an arrow in FIG. 13C. A case of parallel slits is shown in FIG. 14A as a comparative example. In FIGS. 14A and 14B, the horizontal direction corresponds to a direction along which the slits extend.

Because the dielectric anisotropy of the liquid crystal layer is negative, the liquid crystal alignment is so changed as to approach a direction perpendicular to the lines of electric force, and so changed as to approach a direction that is in parallel to the equipotential surface. In FIGS. 14A and 14B, the equipotential surface is shown.

In FIG. 14A, the equipotential surface is sloped in a direction perpendicular to the surface of the drawing, but is not sloped within the surface of the drawing. For that reason, the liquid crystal layer is capable of being sloped in any one of right and left directions of FIG. 14A, that is, in directions along which the slits extend with the same facility. For that reason, with other factors such as the electric field at the ends of the slits or the alignment control structure as a turning point, the liquid crystal layer is sloped in any direction.

However, in this embodiment, with the structure in which the pitches of the slits 11 are continuously changed, the equipotential surface is sloped in a direction along which the pitches are narrow.

In the case of the basic structure shown in FIG. 13A, because the equipotential surface is sloped in the left direction as shown in FIG. 14B, the liquid crystal alignment is more easily sloped in the right direction shown in FIG. 14B. This corresponds to the direction along which the pitches are wider, and coincides with a change in the alignment due to the common electrode 29 at the left end of the slit shown in FIG. 13B.

For that reason, it is possible that the slit structure per se determines the liquid crystal alignment direction at the time of applying a voltage without depending on other factors such as the electric field at the ends of the slits or the alignment control structure.

Figure 15A:
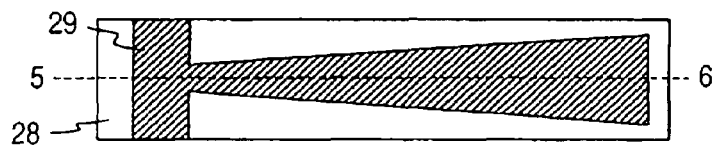
FIGS. 15A and 15B are diagrams showing the alignment control method in the liquid display device according to the fifth embodiment.
Figure 15B:
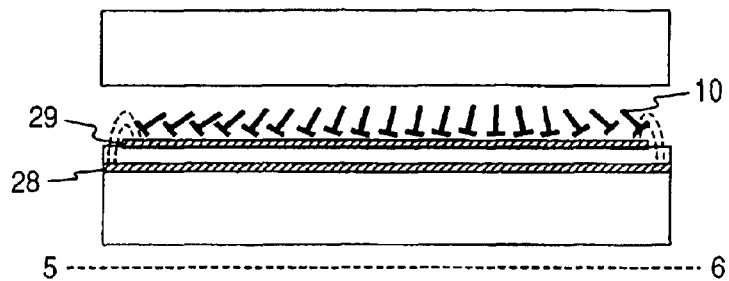

The same description can be given of the liquid crystal alignment control of the comb-like common electrode 29 that separates two slits 11. When it is assumed that the slits are widened from the left end toward the right end as with the slits shown in FIG. 13A, the plane distribution shown in FIG. 15A is obtained. The cross section taken along a dotted line 5-6 that crosses the center of the slit and the liquid crystal alignment at the time of applying a voltage are shown in FIG. 15B. For the reason described with reference to FIG. 14B, the common electrode 29 per se changes to be aligned in a direction along which the comb-like common electrode 29 is wider in the width.

The pixel electrode 28 is disposed as a lower layer of the common electrode 29. In FIGS. 15A and 15B, the pixel electrode 28 is distributed widely as compared with the common electrode 29. In this case, the lines of electric force are developed at both ends of the cross section of FIG. 15B, and the slope direction of the liquid crystal alignment which is induced by the lines of electric force at the left end coincides with the slope direction that is produced by the common electrode 29 per se. However, the former and the latter are opposite in the direction to each other at the right end. Because the slope in the opposite direction of that at the left end is dominant at the right end, the liquid crystal alignment at the right end is reversed, and further spreads toward the left end. Thus, the electrode structure shown in FIGS. 15A and 15B is not uniform because there exist a portion where the liquid crystal alignment on the common electrode 29 is sloped toward the right side and another portion where the liquid crystal alignment is sloped toward the left side.

Figure 16A:
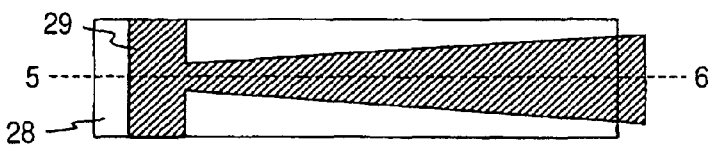
FIGS. 16A and 16B are diagrams showing the alignment control structure and the alignment control method in the liquid display device according to the fifth embodiment.
Figure 16B:
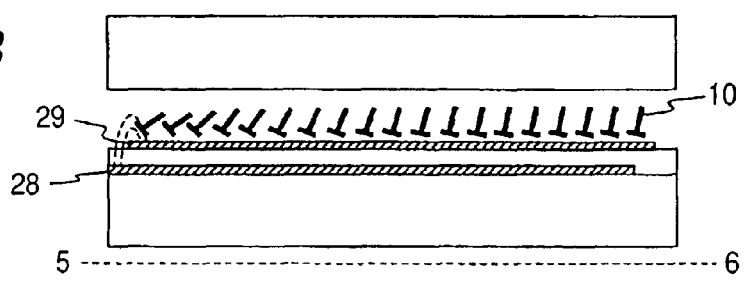

On the contrary, the comb-like common electrode 29 shown in FIGS. 16A and 16B suppresses the occurrence of the lines of electric force at the right end, and the pixel electrode 28 is positioned inside of the common electrode 29 at the right end. As a result, as shown in FIG. 16B, the lines of electric force that draw the arch in the liquid crystal layer are not generated at the right end, and the liquid crystal alignment in the direction opposite to that at the left end is not generated at the right end. For that reason, the liquid crystal alignment on the common electrode 29 becomes uniform, and the liquid crystal alignment is sloped in a direction along which the width of the common electrode 29 is widened over the entire area on the common electrode 29.

To reflect the above phenomenon, as shown in FIG. 11 in this embodiment, the common electrode 29 is comb-shaped, and no pixel electrode 28 exists at the leading edge of the common electrode 29.

As described above, in the case where the slits 11 and the common electrode 29 that separates the slits 11 are continuously changed in the width, the liquid crystal layer is sloped in a direction along which both of those widths are widened at the time of applying a voltage.

Based on the above, a description will be given of a method of conforming the alignment direction of the liquid crystal layer to the same direction when the slits whose width is changed and the common electrode are arranged on the plane.

Figure 17A:
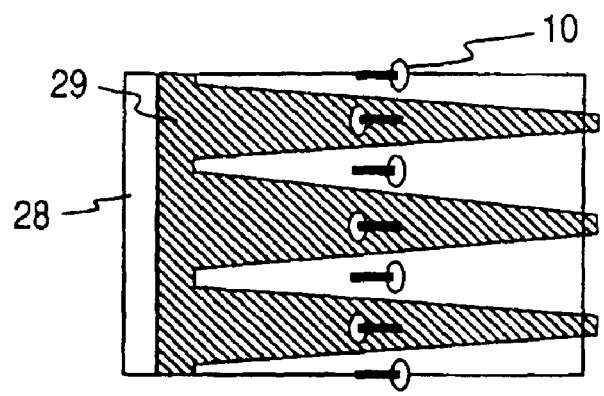
FIGS. 17A to 17C are diagrams showing the alignment control method in the liquid display device according to the fifth embodiment.

First, for example, as shown in FIG. 17A, when the common electrode 29 and the slits 11 are arranged such that the directions of widening the widths are opposite to each other, the layout on the plane is easy, but the liquid crystal alignment directions at the time of applying a voltage are opposite between the slits and the common electrode that separates the slits. In this case, because there occurs a large number of minute areas where the liquid crystal alignment directions are opposite to each other, the liquid crystal alignment at the time of applying a voltage is unstable. Also, portions in which the liquid crystal alignment is vertically aligned without any change even if a voltage is applied occur on the boundaries between the respective areas. Those boundary portions are black display because of the same alignment state as that at the time of applying no voltage, and the transmittance of the bright display is deteriorated. Therefore, the above arrangement of the slits 11 and the common electrode 29 is not preferable, and the liquid crystal alignment directions at the time of applying a voltage must be identical with each other in the slits 11 and the common electrode 29.

Figure 17B:
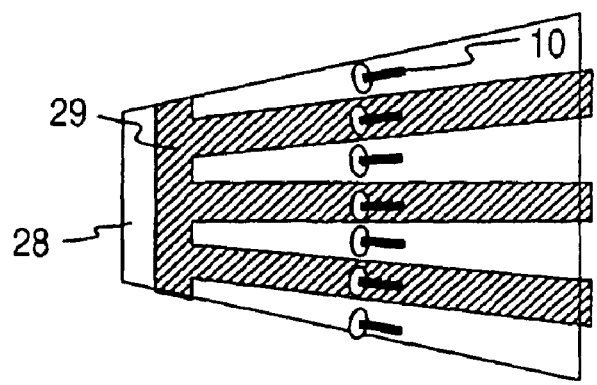

Subsequently, for example, as shown in FIG. 17B, it is preferable that the slits 11 and the common electrode 29 are arranged in a fan like area, and the directions along which the widths of the slits are widened are conformed to the same direction so that the widths of the common electrode are kept constant.

Figure 17C:
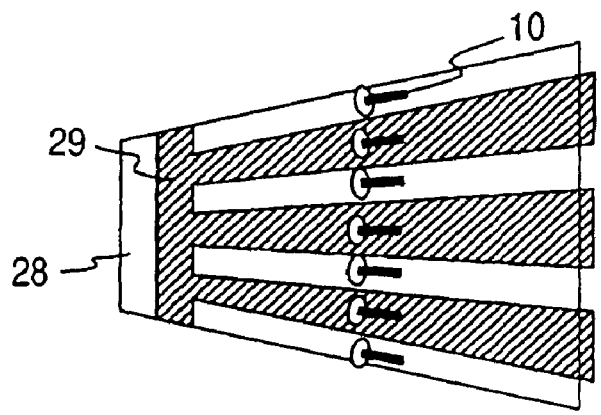

Also, for example, as shown in FIG. 17C, it is preferable that the directions along which the widths of the common electrode are widened are conformed to the same direction, and the widths of the slits are kept constant. A structure in which both of the widths of the common electrode 29 and the slits 11 are continuously changed is also preferable.

With the above structures, the common electrode is of the wider fan like configuration, and the layout becomes difficult. However, the liquid crystal alignment directions at the time of applying a voltage can be conformed to the same direction by conforming the directions along which the widths of the slits and the common electrode are widened to the same direction.

Normally, the configuration of the pixel is rectangular or square. However, when the fan like areas are disposed in opposite directions, respectively, it is possible that the fan like areas fall within the rectangular or square pixel, and the plural areas that are different in the alignment direction from each other at the time of applying a voltage are formed within one pixel.

When the plural assembly of the slits 11 are disposed within one pixel, it is necessary to reduce a dead space where no voltage is applied to the liquid crystal layer 10, and attention must be paid to the mutual arrangement. Also, in the case where there are two assembles of the slit structure, the directions along which the liquid crystal layer 10 is sloped are opposite to each other at the time of applying a voltage by disposing the assembles of the slits 11 so that the directions along which the pitches are widened are opposite to each other. As a result, the azimuth dependency of the viewing performance is compensated.

Figure 18:
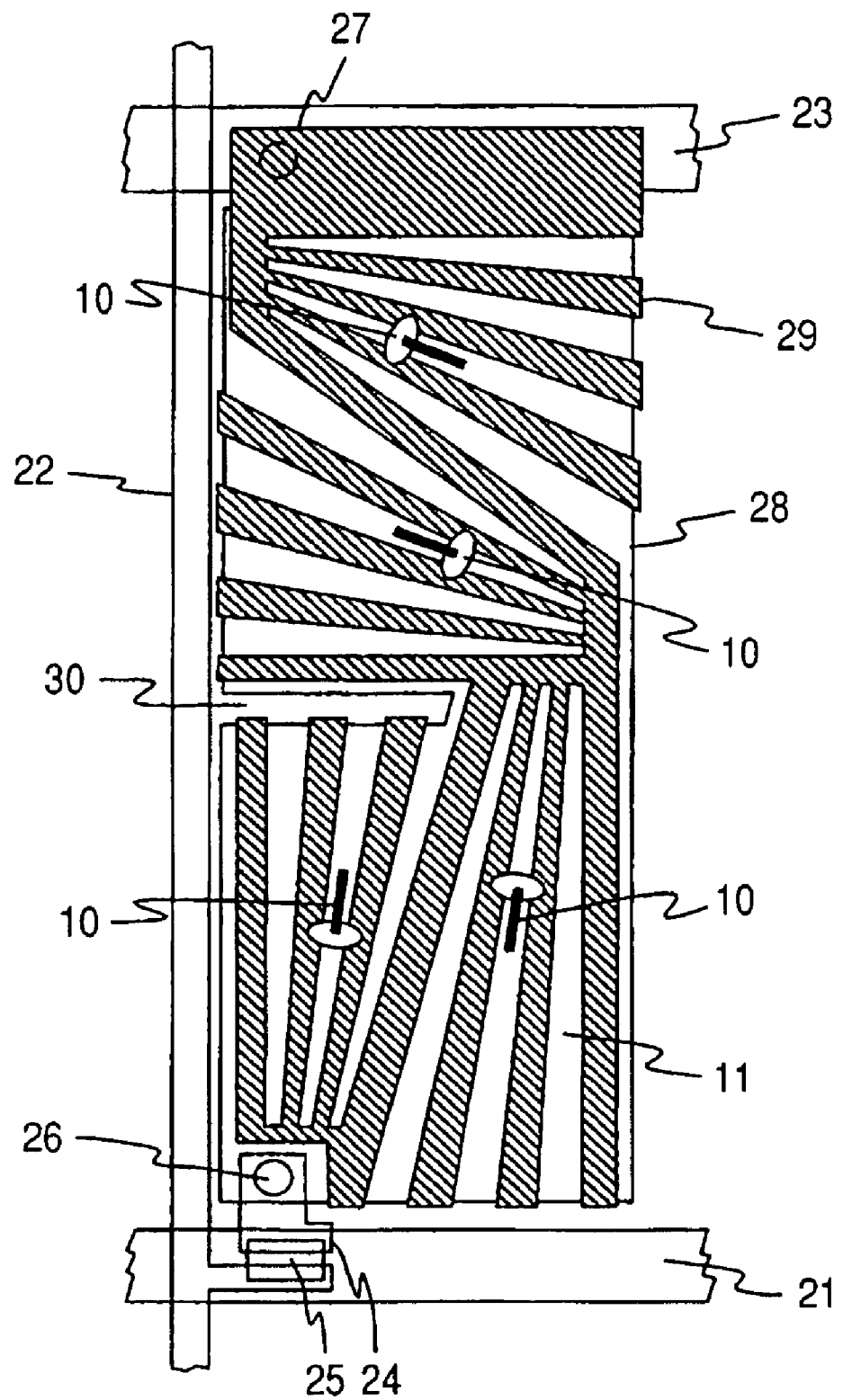
FIG. 18 is a plan distribution view showing the alignment control structure, and the various lines and electrodes on the second substrate in the liquid display device according to the fifth embodiment.

FIG. 18 shows a plan structure of one pixel in the case where there are four assembles of the slits 11. The assembles of the respective slits 11 are arranged so that the directions along which the pitches are widened form substantially 90 degree in association with each other. In this case, in the assembles of the respective slits, the common electrode 29 is of the comb configuration, and no pixel electrode 28 exists on the leading edge of the common electrode 29. With the above structure, the pixel electrode 28 is not of the simple configuration up to now, and forms a notch indicated by reference numeral 30 in FIG. 18. In this case, the assembles of the slits 11 more excellently compensate the azimuth dependency of the viewing performance as compared with the case having two assembles shown in FIG. 11.

Because the higher electric field is applied to the liquid crystal layer 10 as the pitches of the slits 11 are narrower, a change in the alignment occurs in the liquid crystal layer 10 at the lower voltage value. Also, in the case where the applied voltage is small, a change in the alignment occurs such that the liquid crystal alignment is sloped toward the vertical direction of the slit structure in the liquid crystal layer 10 at the end of the slits.

In this event, the spray deformation that is produced in the liquid crystal layer 10 is larger as the pitches of the slits 11 are narrower. For that reason, a change in the alignment in a direction parallel to the slits 11 is also caused by a lower voltage at a side where the pitches are narrower, and the change in the alignment is sequentially shifted to a side where the pitches are broader.

Because the alignment state at the time of applying a voltage is different depending on a difference in the pitch of the slits 11, the tilt angle of the liquid crystal layer 10 is also different at the respective portions within one pixel which are different in the pitch of the slits 11. In other words, a continuous change is given to the pitch of the slit 11, to thereby make it possible to give the broader tilt angle distribution to the liquid crystal layer 10 within one pixel. As a result, the half-tone shift in the oblique direction is further reduced.

Also, in this embodiment, since the alignment control structure 12 is not used, the deterioration in the transmittance due to the alignment control structure 12 is not caused at all, to thereby obtain the higher transmittance in the bright display.

Sixth Embodiment

An electrode structure that a lateral electric field is applied to the liquid crystal layer 10 is not limited to that in the first embodiment. In the third embodiment, both of the pixel electrode 28 and the common electrode 29 are comb-shaped and formed on the same layer. When the electrode structure according to the first embodiment is compared with that according to the third embodiment, the slits 11 of the common electrode 29 according to the first embodiment is confronted with the comb-like gap of the third embodiment.

FIG. 19A shows a cross-sectional view of a surface perpendicular to the slit direction in the liquid crystal display device according to the first embodiment. FIG. 19B shows a cross-sectional view of a surface perpendicular to the comb direction in the liquid crystal display device according to the third embodiment. In the liquid crystal display device according to the first embodiment, the lines of electric force are formed between the pixel electrode 28 and the common electrode 29 which exist on the different layers as shown in FIG. 19A. On the other hand, in the liquid crystal display device according to the third embodiment, the lines of electric force are formed between the pixel electrode 28 and the common electrode 29 which exist on the same layer as shown in FIG. 19B.

When the manufacture process is identical, the minimum machining dimensions of the slits 11 and the comb gaps are identical. In the liquid crystal display device according to the first embodiment, two lines of arch electric force are formed in one slit 11 at the time of applying a voltage as shown in FIG. 19A. On the contrary, in the liquid crystal display device according to the third embodiment, only one line of arch electric force is formed in the comb gap as shown in FIG. 19B.

Therefore, the electrode structure according to the first embodiment is capable of forming the finer domain structure when the machining dimensions are identical. For example, in the liquid crystal display device that requires the high precision display, the pixels must be miniaturized. When the pixels are miniaturized, the number of slits 11 or comb-like structures which can be arranged within one pixel is also limited according to the restriction of the minimum machining dimensions in the manufacture process. In addition, when the pixels are miniaturized, it is assumed that plural domain formation is disenabled within one pixel. In this situation, the viewing performance is remarkably deteriorated. The pixel structure according to the first embodiment is capable of performing both of the high precision display and the high image quality since the plural domains can be relatively readily formed even by the finer pixel.

Seventh Embodiment

In this embodiment, a case using the liquid crystal display device according to the present invention for the portable information device is studied. Because the portable information device is used under the diverse environments from the outdoors in fine weather to the dark room, the reflective display that uses the environment light must be enabled in addition to the transmissive display. The reflection of the environment light is generated even in the transmission type liquid crystal display device, and the transparent pixel portion for the transmissive display also reflects the environment light on an interface that is different in the refractive index. When those reflected lights exercise the same change in the intensity as that of the transmission light with respect to the applied voltage, the reflected lights can be used as the reflective display. However, in most of cases, the reflected lights cannot be used as the reflective display, and are dealt with as unnecessary reflection to deteriorate the viewing performance.

When attention is paid to the cross-sectional structure of the transparent pixel portion, as shown in FIG. 2, plural transparent electrodes and insulation layers are formed at a side close to the liquid crystal layer 10 of the second substrate 32, and plural interfaces exist. The VA type liquid crystal display device sets the dark display at the time of applying no voltage, and in this situation, the environment light that has passed through the upper polarizer 41 into a linearly polarized light inputs the interface on the second substrate 32, is reflected from the interface, and again reaches the first polarizer 41. During this process, since the polarization state is hardly changed, the environment light passes through the first polarizer 41 with substantially the highest efficiency, and increases the brightness of the dark display.

On the contrary, in the liquid crystal display device according to the first embodiment, as shown in FIG. 20, a second upper phase plate 45 is disposed between a first upper phase plate 43 and a first substrate 31, the Δnd is changed to a quarter wave plate, and its slow axis forms 45 degrees with respect to the absorption axis of the polarizer close to the slow axis. Also, a second lower phase plate 46 is disposed between a first lower phase plate 44 and a second substrate 32, the Δnd is changed to a quarter wave plate, and its slow axis forms 45 degrees with respect to the slow axis of the second upper phase plate 45.

Upon reception of the polarization conversion action of the quarter wave plate, the environment light becomes a circularly polarized light at the time of inputting the environment light to the interface on the second substrate 32. Then, when the environment light again reaches the first polarizer 41, the environment light becomes a linearly polarized light that is in parallel to the absorption axis, and is then substantially completely absorbed by the first polarizer 41. A reflected light 62 does not increase at least the brightness of the dark display, and can be used as the reflective display.

The stretched material of cyclo-olefin organic polymer can be used for the second upper phase plate 45 and the second lower phase plate 46. Because the wavelength dependency of Δnd is relatively small, there is a feature that coloring of the reflective dark display is reduced. In recent years, cellulose or polycarbonate organic polymer having the inverse dispersion characteristic that increases Δnd together with the wavelength has been developed, and coloring of the reflective dark display can be further reduced with the use of the organic polymer.

Figure 21:
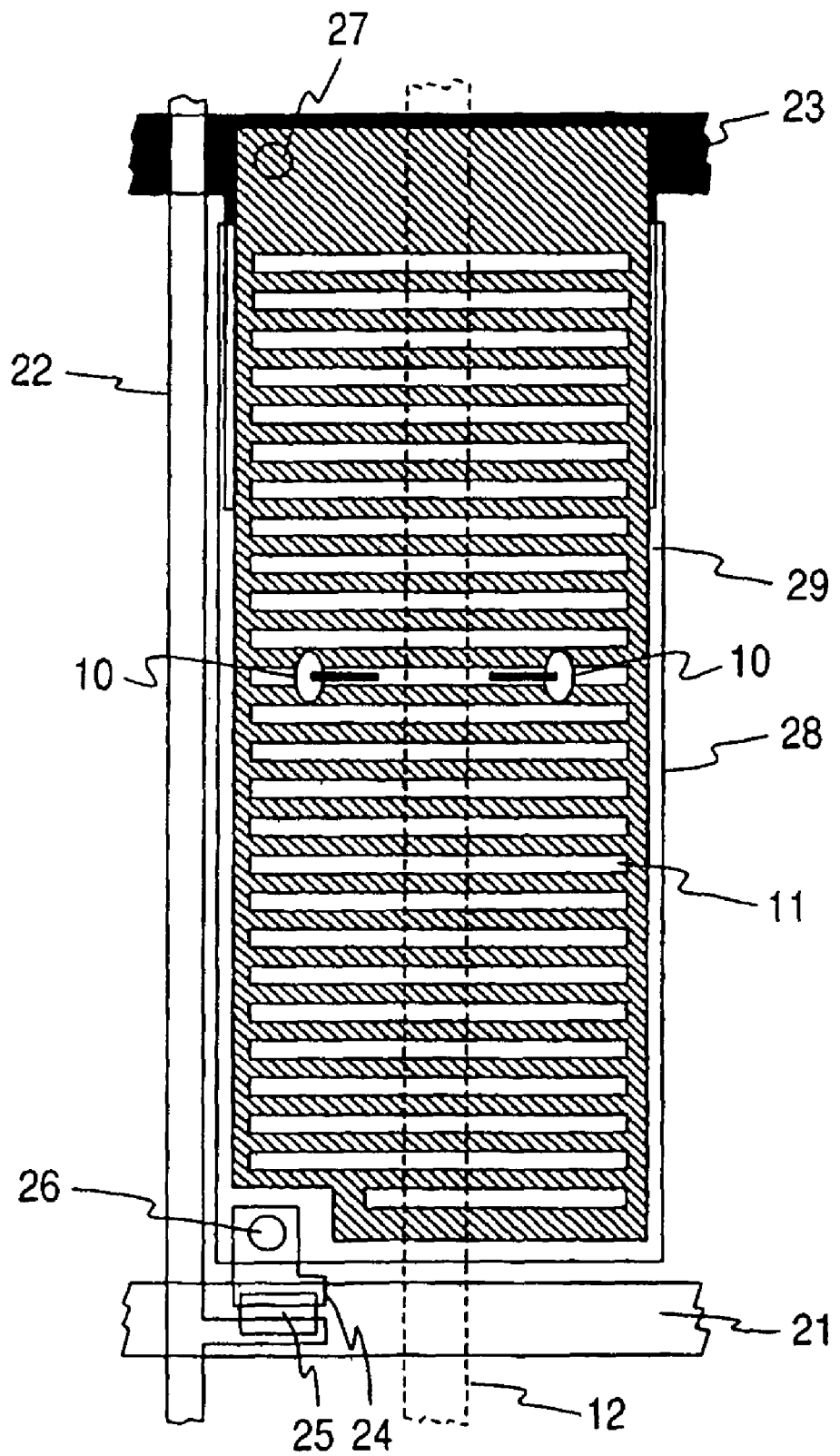
FIG. 21 is a plan distribution view showing an alignment control structure, and various lines and electrodes on a second substrate in the liquid display device according to the seventh embodiment.

Also, when the reflective portion is disposed within the pixel to enable both of the transmissive display and the reflective display, more excellent reflective display is enabled. FIGS. 21 and 20 show an example in which the liquid crystal display device according to the first embodiment is transflective. As shown in FIG. 21, the common line 23 is so projected as to be distributed below the pixel electrode 28 as shown in FIG. 21, and that portion reflects the light as the reflective portion.

As shown as the reflected light 62 in FIG. 20, in the reflective portion, because the light reciprocates the liquid crystal layer 10 and passes through the liquid crystal layer 10, the effective Δnd of the liquid crystal layer 10 is doubled. Therefore, in order to make the applied voltage dependency of the reflective portion identical with that of the transmissive portion, a liquid crystal layer thickness adjustment layer 48 is newly disposed at a side close to the liquid crystal layer 10 of the first substrate 31, and the effective Δnd of the reflective portion is adjusted to make the applied voltage dependency identical with that of the transmissive portion.

Also, in the reflective portion, because the light reciprocates the color filter 36 and passes through the color filter 36, when the color filter having the same optical density as that of the transmissive portion is used, undue coloring is produced, and the reflectivity and the color balance are deteriorated. For that reason, a hole portion 38 is defined in the color filter 36 on the reflective portion to form a portion where no color filter exists on the reflective portion. The reflectivity and the hue of the reflective portion are determined according to the additive color mixture of the hole 38 and the portion in which the color filter 36 exists. Because the hole 38 is unpigmented and high in the reflectivity, the area ratio of the hole 38 in the reflective portion is so adjusted as to recover the reflectivity and the color balance.

In FIG. 21, the distribution of the alignment control structure 12 is identical with those in the first embodiment, and in the liquid crystal layer thickness adjustment layer 48 that is newly added, the alignment control structure 12 is so distributed as to cross the liquid crystal layer thickness adjustment layer 48. For that reason, in both of the transmissive portion and the reflective portion, the liquid crystal alignment direction at the time of applying a voltage is determined to form a multi-domain structure as in the first embodiment.

Also, since the common line 23 is projected downward and also serves as a reflector, there is obtained the effect of reducing the manufacture process. In addition, when the common line 23 is made of aluminum that is high in reflectivity, brighter reflective display is obtained.

The surface of the reflector thus structured causes specular reflection because of the flatness. However, a light diffusion layer 47 is disposed between the second upper phase plate 45 and the first substrate 31, to thereby reduce the specular reflection and increase the diffusion reflective component. As a result, it is possible to reduce a rapid change in the intensity of the reflected light with a change in the incident condition of the environment light. The light diffusion layer 47 may be obtained by mixing an adhesive layer of the second upper phase plate 45 with fine spheres that are different in the reflectivity from the adhesive layer.

An increase in the diffusion reflective component due to the light diffusion layer 47 is not sufficient, and the light diffusion layer 47 has the adverse reaction of increasing the dark display transmittance. It is more preferable that the light diffusion layer 47 is removed, and smooth asperity is given to the surface of the reflector to provide a diffusion reflector instead because an increase in the reflectivity and an increase in the transmission contrast ratio are obtained.

The above reflector is disposed in proximity to the pixel electrode, and a asperity formation layer is formed between the reflector and the insulation layer. The asperity formation layer is formed by melting and solidifying an organic insulation film that has been patterned in a cylinder. The asperity formation layer has a two-dimensionally curved oblique surface due to the surface tension at the time of melting, and a smooth asperity is given to the surface of the reflector which is close to the asperity formation layer. When the distribution of the asperity formation layer is regularly arranged, for example, finely filled, the oblique surface can be increased. However, coloring occurs due to an interference of the reflected light. Therefore, coloring due to the interference is reduced by appropriately shifting the distribution of the asperity formation layer from the regular arrangement with the use of random number.

The reflector may be made of chromium, and more preferably made of aluminum or silver which is higher in the reflectivity than chromium and whose reflected light is achromatic. In the case where aluminum is used for the reflector, it is necessary to prevent direct contact with the pixel electrode which is made of ITO.

As described above, the reflective display using the environment light in addition to the transmissive display that is high in the contrast and wide in the viewing angle is enabled, and display of the excellent visibility under the diverse environments is obtained.

Eighth Embodiment

Figure 22:
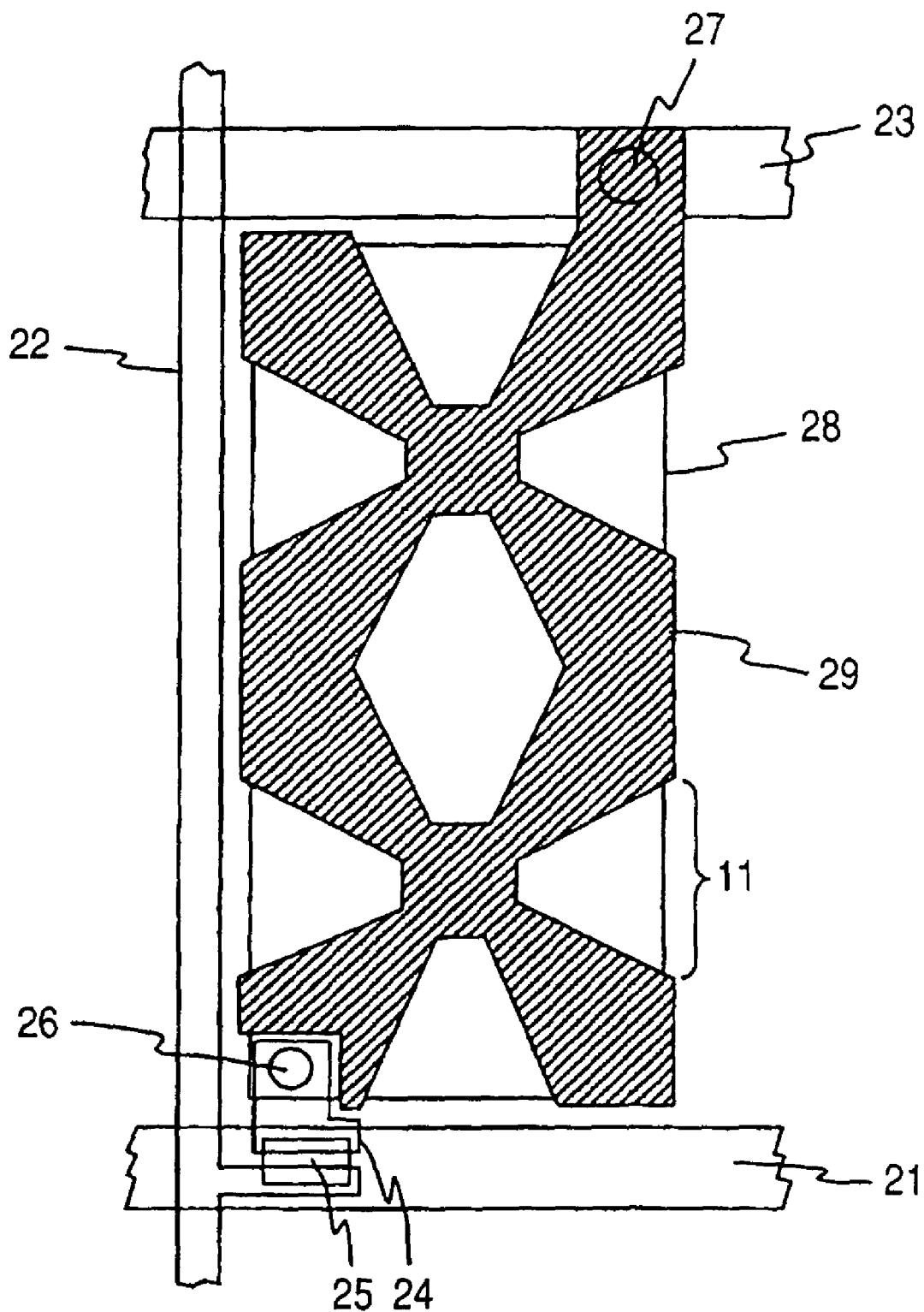
FIG. 22 is a plan view showing one example of a pixel structure of a liquid crystal display device according to an eighth embodiment.

In this embodiment, as shown in FIG. 22, the arrangement of the slits 11 in the fifth embodiment is distributed in a radial fashion so as to be symmetrically extended from the center of the pixel toward the surroundings. However, because the ends of the slits are concentrated in the center of the radial slit distribution in the fifth embodiment, the finer structure is required, and there is a limit of the minimum machining dimensions. For that reason, in this embodiment, in order that the finer distribution of the lines of electric force can be formed by the same minimum machining dimensions, the common electrode 29 and the pixel electrode 28 are formed on the different layers.

As described in the fifth embodiment, in order to conform the liquid crystal alignment directions at the slits 11 and the pixel electrode 28 that separates the slits 11 to the same direction, the widths of the slits 11 and the pixel electrode 28 are so arranged as to be widened in the same direction. However, when a large number of slits 11 and the pixel electrode 28 are so arranged as to be adjacent to each other, the slits 11 and the pixel electrode 28 are distributed in the fan configuration, and when a larger number of slits 11 and the pixel electrode 28 are so disposed as to be adjacent to each other, both ends of the fan configuration is connected to form a radial distribution.

As described above, the radial distribution of the slits 11 is required for the structure of the slits 11 and the pixel electrode 28 that separates the slits 11, and is advantageous in the multi-domains that makes the liquid crystal alignment directions at the time of applying a voltage different in four or more directions.

FIG. 22 shows the pixel structure of the liquid crystal display device according to this embodiment. Two upper and lower unit electrode structures that produce the radial alignment are connected to each other. Each of those unit electrode structures is substantially square and has four slits 11. Each of those slits 11 extend toward the sides of the square from the center of the square.

Figure 23A:
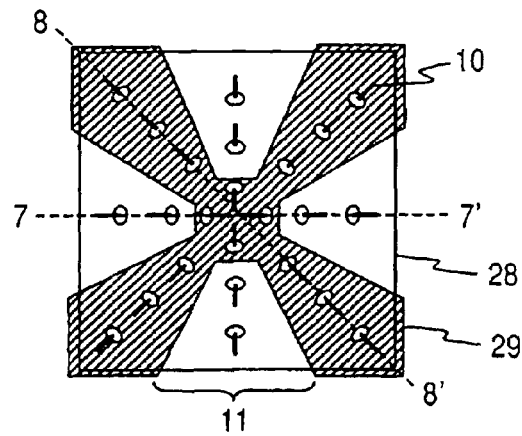
FIGS. 23A to 23C are diagrams showing liquid crystal alignment at the time of applying a voltage in the liquid crystal display device according to the eighth embodiment.
Figure 23B:
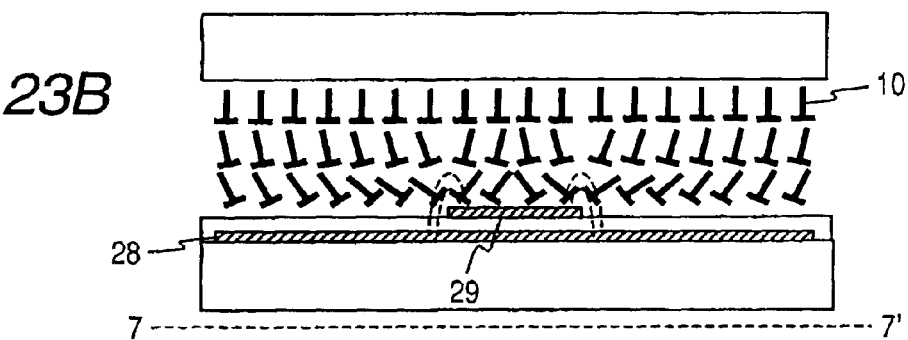
Figure 23C:
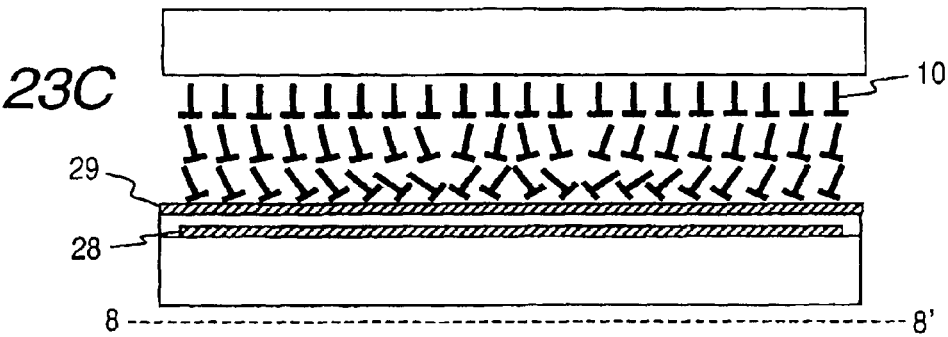

FIGS. 23A to 23C show the alignment direction of the liquid crystal layer at the time of applying a voltage. FIG. 23A is a plan view taken along a direction normal to the substrate. FIG. 23B is a cross-sectional view taken along a line (dotted line 7-7') which passes through the center of the unit electrode structure and is in parallel to one side of a square in which the unit electrode structure is inscribed. FIG. 23C is a cross-sectional view taken along a diagonal line (dotted line 8-8') of the square which passes through the center of the unit electrode structure.

FIG. 23B is a cross section including the slits 11, and FIG. 23C is a cross section including no slits 11. As shown in FIG. 23B, the liquid crystal layer is sloped in a direction of increasing the slit widths within the slits 11. This action is conducted because the alignment control of the slit per se and the alignment control due to the lines of electric force at the slit ends facilitate each other. The slope of the equipotential surface shown in FIG. 14B is increased more as an increase in the slit width is more precipitous. As a result, the alignment control of the slit per se becomes more stable.

In this embodiment, because the slit distribution is radial, and the number of slits is set to 4 which is close to the minimum value as the radial slit distribution, an increase in the slit width is made precipitous, and the alignment control of the slit per se is more stabilized.

In most cases, the pixel of the liquid crystal display device is rectangular, and can be divided into plural unit electrode structures that are substantially square. In the case where the unit electrode structure is substantially square, a structure in which the slits are extended toward the four sides of the square unit electrode from the center thereof, or a structure in which the slits are extended toward four corners thereof is natural. FIG. 23A shows the former. In the case where the plural unit electrode structures are arranged to approach each other, the slit of one unit electrode structure comes in contact with the slit of another unit electrode structure on the boundary, and the pixel electrode of one unit electrode structure comes in contact with the pixel electrode of another unit electrode structure on the boundary. This structure is preferable because the liquid crystal alignment within the pixel is stabilized.

When the liquid crystal alignment on the boundary where the slits come in contact with each other is considered, if two structures shown in FIG. 23A are merely aligned, it appears that the discontinuous surface of the liquid crystal alignment is formed on the boundary. In fact, because the alignment deformation is large, no discontinuous surface is formed, and spiral alignment is formed centered on one point on the boundary. The same is applied to the boundary where the pixel electrodes come in contact with each other, and three centers of the spiral alignments are formed on the tangent line of two unit electrode structures.

When the slit of one unit electrode structure comes in contact with the slit of another unit electrode structure on the boundary, an arch electric field is developed on the boundary, and there occurs the liquid crystal alignment opposite to that of the slits of the respective unit electrode structure and that of the pixel electrode. As a result, still more spiral alignments are formed in the interior of the unit electrode structure. When a large number of spiral alignments that approach each other exist, the position of the spiral alignment becomes unstable, or the plural spiral alignments are incorporated together, as a result of which the liquid crystal alignment becomes unstable. When the position and the number of spiral alignments are different in each of pixels, the oblique characteristic is different according to each of the pixels. In this case, the display looks unevenly particularly when the display is observed from an angular direction apart from the normal direction of the liquid crystal display device. Therefore, this structure is not preferable.

The lines of electric force at the ends of the slits determine the liquid crystal alignment within the slits, and affect the liquid crystal alignment of portions in which no slit exist, that is, the liquid crystal alignment of the center portion shown in FIG. 23B. The liquid crystal alignment in the center portion of the unit electrode structure is opposite to that of slit portions that are close to the center portion as indicated by nail marks in FIG. 23A, and the liquid crystal layer is sloped toward the center portion of the unit electrode structure.

Also, as shown in FIG. 23C, the liquid crystal layer on the common electrode 29 at the time of applying a voltage is aligned in a direction of increasing the width of the common electrode. However, the alignment control is not conducted in the center portion of the drawing, which corresponds to the inside of the slit end. The center portion is affected by the slit portions and sloped toward the center portion of the unit electrode structure in the cross section on the common electrode 29.

In conclusion, as shown in FIG. 23A, the liquid crystal layer is sloped toward the external on a portion of the unit electrode structure corresponding to the outside of the slit end, and the liquid crystal layer is sloped toward the internal on a portion of the unit electrode structure corresponding to the inside of the slit end.

Figure 24:
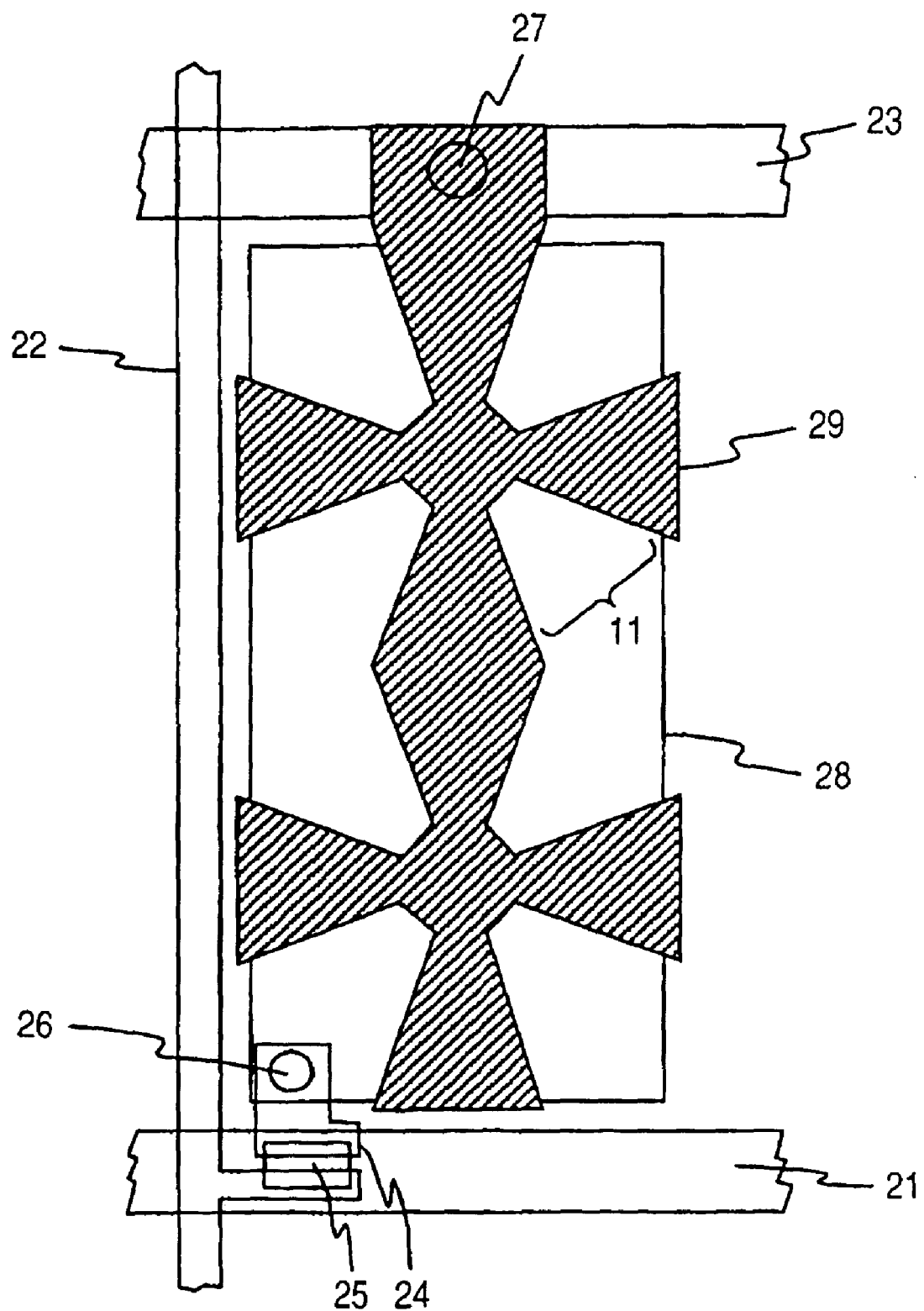
FIG. 24 is a view showing another example of a pixel structure of a liquid crystal display device according to the eighth embodiment.

FIG. 24 shows another example of the electrode structure that realizes the radial alignment. The slits are distributed on the diagonal line of a square in which the unit electrode structure is inscribed, and the diagonal line is larger than lines that are in parallel to the respective sides among the lines that pass through the center of the unit electrode structure.

The interiors of the slits are affected by the alignment control due to the slit structure as well as the alignment control due to the lines of electric force at the slit ends. On the other hand, the common electrode is affected by only the alignment control due to the slit structure. Therefore, the interiors of the slits are capable of sloping the liquid crystal layer at a lower applied voltage.

Figure 27A:
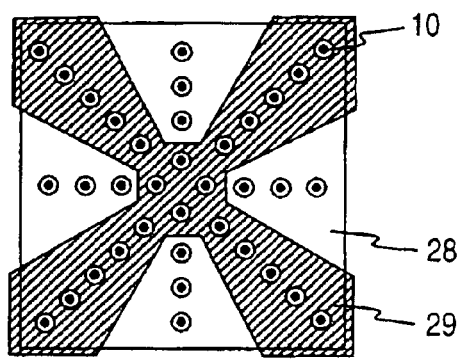
FIGS. 27A to 27D are plan views showing a change in the alignment of the liquid crystal at the time of applying a voltage in a unit electrode structure.
Figure 27B:
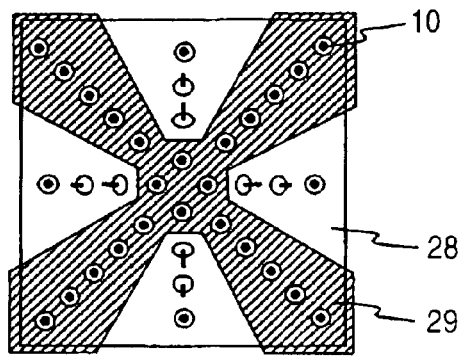
Figure 27C:
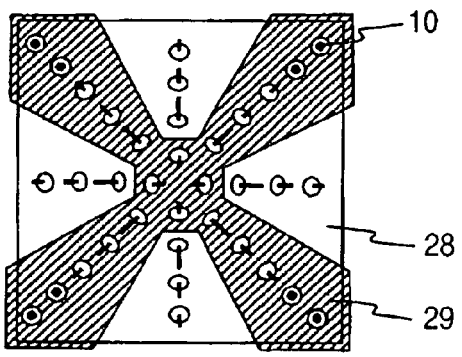
Figure 27D:
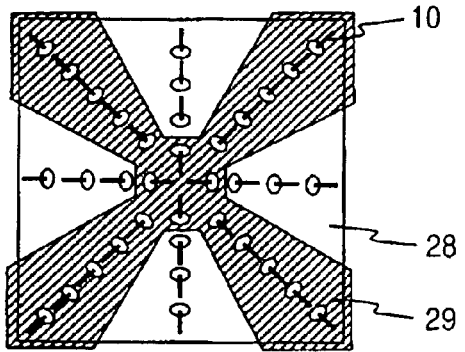

FIGS. 27A to 27D show the appearance of a change in the voltage of the liquid crystal alignment in the unit electrode structure. A voltage that is applied to the liquid crystal layer is higher in the stated order of FIGS. 27D, 27C, 27B, and 27A. The liquid crystal alignment is vertically aligned over the entire pixel at the time of applying no voltage (FIG. 27A). When a voltage is applied, a change in the alignment is first produced at the slit portion in the vicinity of the center portion of the unit electrode structure (FIG. 27B). In other words, this is because the density of the lines of electric force is highest on that portion, and a change in the alignment is liable to occurring in the liquid crystal layer even at a lower voltage. A change in the alignment of the slit portion propagates toward the periphery from the vicinity of the center portion of the unit electrode structure, and a change in the alignment occurs even in the pixel electrode that is relatively low in the density of the lines of electric force in the vicinity of the center portion of the unit electrode structure (FIG. 27C). In addition, a change in the alignment in the pixel electrode also propagates up to the periphery of the unit electrode structure, and a change in the alignment occurs over the entire are of the unit electrode structure (FIG. 27D).

Therefore, as shown in FIG. 24, when the slits are distributed on the longer diagonal line, a change in the liquid crystal alignment within one unit electrode structure at the time of applying a voltage can be more uniformed, and the driving voltage can be lowered.

On the other hand, as shown in FIG. 22, when the slits are so arranged as to be directed toward the respective sides of the square in which the unit electrode structure is inscribed, the liquid crystal alignment is sloped within the slits at a lower voltage, and the liquid crystal alignment on the common electrode is not sloped when the applied voltage is not higher. Thus, a change in the liquid crystal alignment within one unit electrode structure at the time of applying a voltage becomes uneven, but a tone shift in an oblique direction inherent to the VA type liquid crystal display device can be reduced.

Figure 28A:
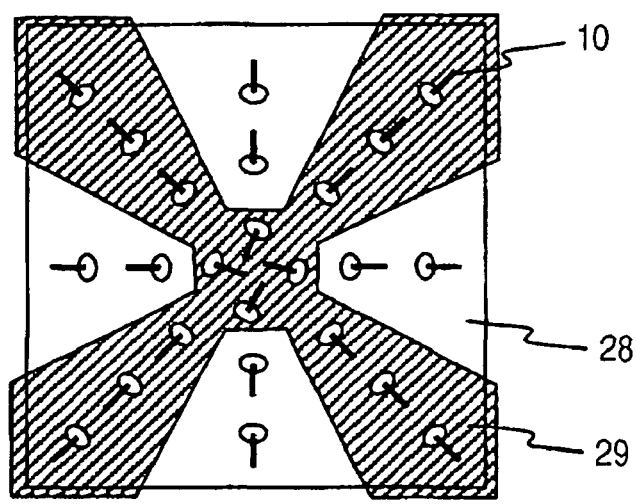
FIGS. 28A and 28B are plan views showing an example in which the liquid crystal layer is of a twist alignment in the center of the unit electrode structure.
Figure 28B:
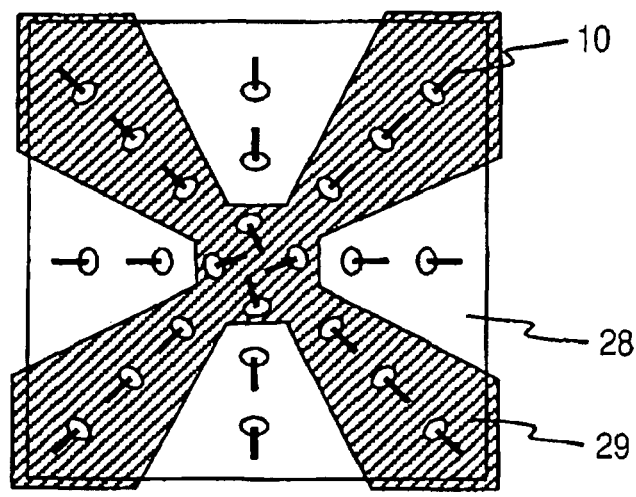

Also, as shown in FIG. 23A, the liquid crystal layer is sloped toward the inside in a portion of the unit electrode structure corresponding to the inside of the slit ends, but in this situation, a radial alignment occurs in the liquid layer in the center portion of the unit electrode structure. The center portion is particularly large in the spray deformation. In order to reduce the spray deformation, in fact, not the radial alignment but the spiral alignment occurs as shown in FIGS. 28A and 28B. In order to stabilize the spiral alignment, a chiral agent containing organic monocles having a chiral center can be mixed with the liquid crystal layer. In this situation, since the mixture ratio of the chiral agent may be, for example, 1 wt % or lower since the chiral agent does not have to affect the vertical alignment at the time of applying a voltage.

Figure 25:
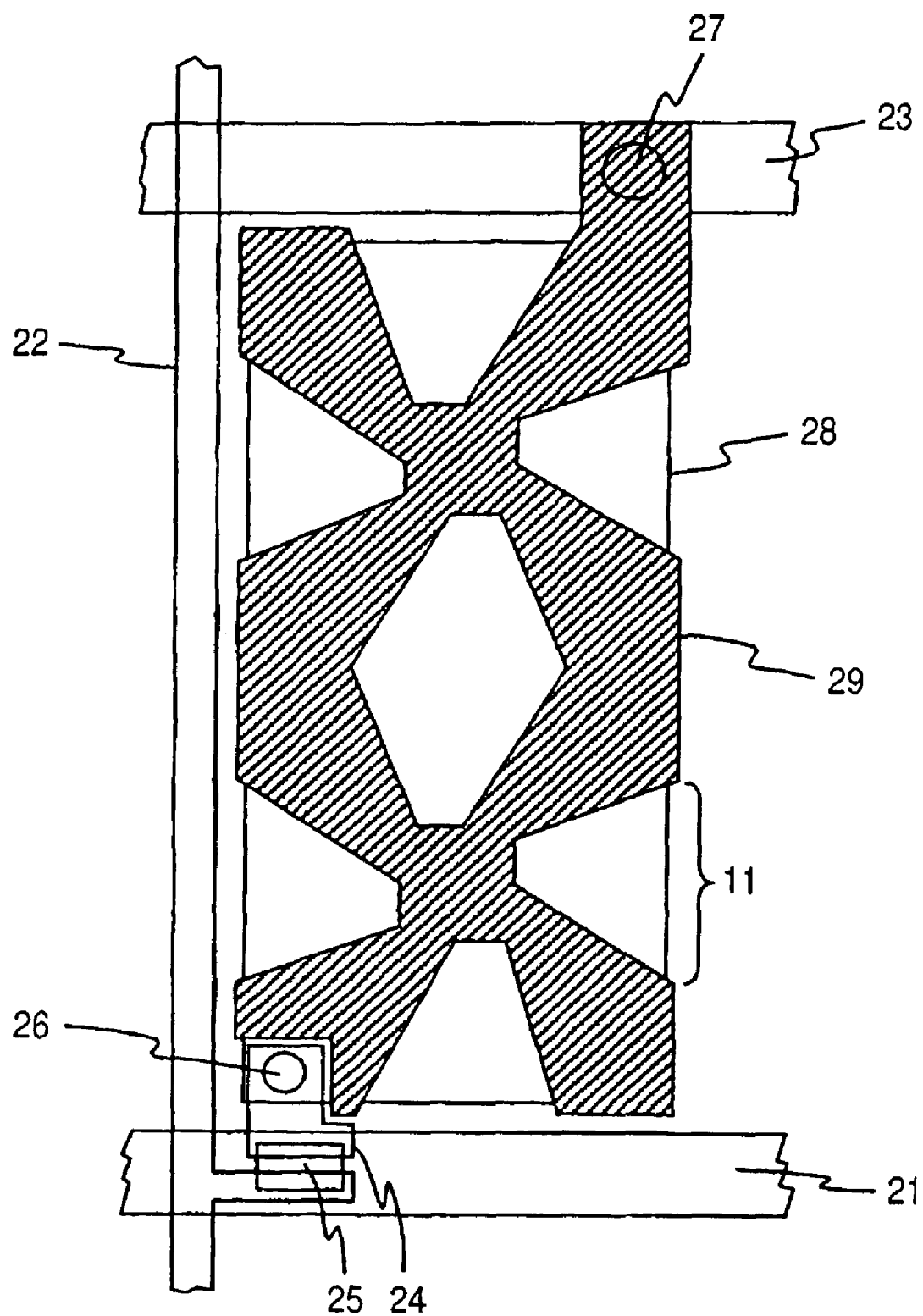
FIG. 25 is a plan view showing still another example of a pixel structure of a liquid crystal display device according to the eighth embodiment.

In order to further stabilize the spiral alignment in the center portion of the unit electrode structure as described above, the distribution of the slits can be formed in a spiral as shown in FIG. 25.

Referring to FIG. 25, since the distribution per se of the lines of electric force at the slit ends is spiral, not only the spiral alignment is produced for the purpose of reducing the spray deformation, but also the spiral alignment is formed as the stable alignment state from the viewpoint of an electric energy. When the chiral agent and the spiral slit structure are used together, the synergetic effect of the spiral alignment stabilization is obtained by making the twist direction that is induced by the chiral agent and the twist direction that is induced by the electric field identical with each other.

Also, a change in the alignment at the time of applying a voltage is produced at the lowest voltage on the slit ends which are in the vicinity of the center portion of the unit electrode structure, and is then produced toward the outside of the unit electrode structure within the slit. The driving voltage can be lowered more as the size of the unit electrode structure is smaller.

In the case where the size of one pixel is sufficiently small, the unit electrode structure of 1×2 (width×height) is arranged within one pixel as shown in FIG. 22. In the case where the size of one pixel is larger than the above size, for example, the unit electrode structure may be arranged with the size of 2×6 or the size of 3×9.

Also, it is possible that the individual unit electrode structures are increased in the size, and in this case, in order to prevent the density of the lines of arch electric force that is distributed within the unit electrode structure from being deteriorated, the number of slits that extend toward the respective sides or the number of pixel electrodes can be increased more than 1 per each of the sides shown in FIG. 23A.

Figure 29:
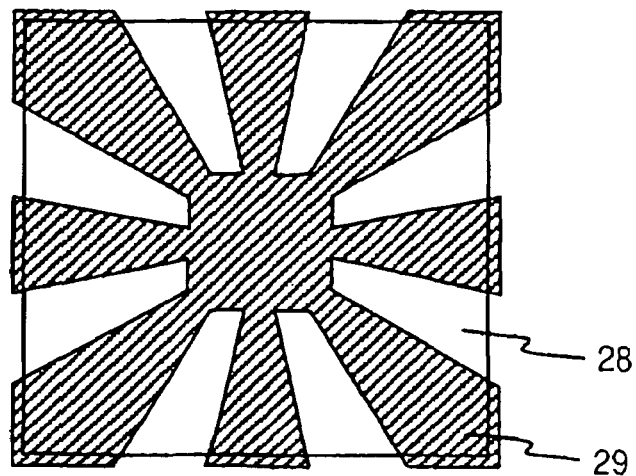
FIG. 29 is a plan view showing one example of the unit electrode structure having two slits that are directed toward one side of a square.

An example thereof is shown in FIG. 29. FIG. 29 shows an example in which the number of slits that extend toward the respective sides increases two slits per side. Because the spiral alignment occurs on the boundary of the unit electrode structure, the number of centers of the spiral alignments increases with an increase in the number of unit electrode structures. On the contrary, when the number of slits with each of the unit electrode structures or the number of pixel electrodes can be increased without increasing the number of unit electrode structures within one pixel, there is advantageous in that the pixel can be upsized without enough increasing the number of spiral alignments within one pixel.

Also, when the minimum machining dimensions of the manufacture process is permitted, it is possible that the size of the unit electrode structure is kept constant, and the number of slits within the respective unit electrode structures is increased. In this situation, the density of the arch lines of electric force that is distributed within the unit electrode structure is increased, and the intensity of the electric field that is applied to the liquid crystal layer increases. As a result, it is advantageous in that the driving voltage can be reduced.

As described above, the azimuth in the liquid crystal alignment direction at the time of applying a voltage is increased more than the four directions in the fifth embodiment, and the azimuth dependency of the oblique characteristic can be further averaged. In this situation, the applied voltage dependency of a change in the liquid crystal alignment is different between the slits and the common electrode within one unit electrode structure. Further, a change in the alignment occurs in the order from the center portion of the unit electrode structure on the slit, and a distribution of the liquid crystal alignment is provided. For that reason, there is obtained the transmissive display that is excellent in the gray scale productivity while the azimuth dependency of the oblique characteristic is more averaged.

Ninth Embodiment

A change in the alignment is difficult to occur in the center portion of the unit electrode structure in the ninth embodiment since the spiral alignment occurs in a narrower area, and a factor that stabilizes the alignment is only the electric field at the ends of the slits. Then, when the applied voltage dependency of the transmittance is partially viewed, the center portion is gentle particularly in an increase in the transmittance.

Under the circumstances, when the liquid crystal display device according to the present invention is of the transflective, apart or all of the common electrode, or apart of pixel electrode constitutes the reflective electrode, or the center portion of the unit electrode structure can be used for the reflective portion.

Figure 26:
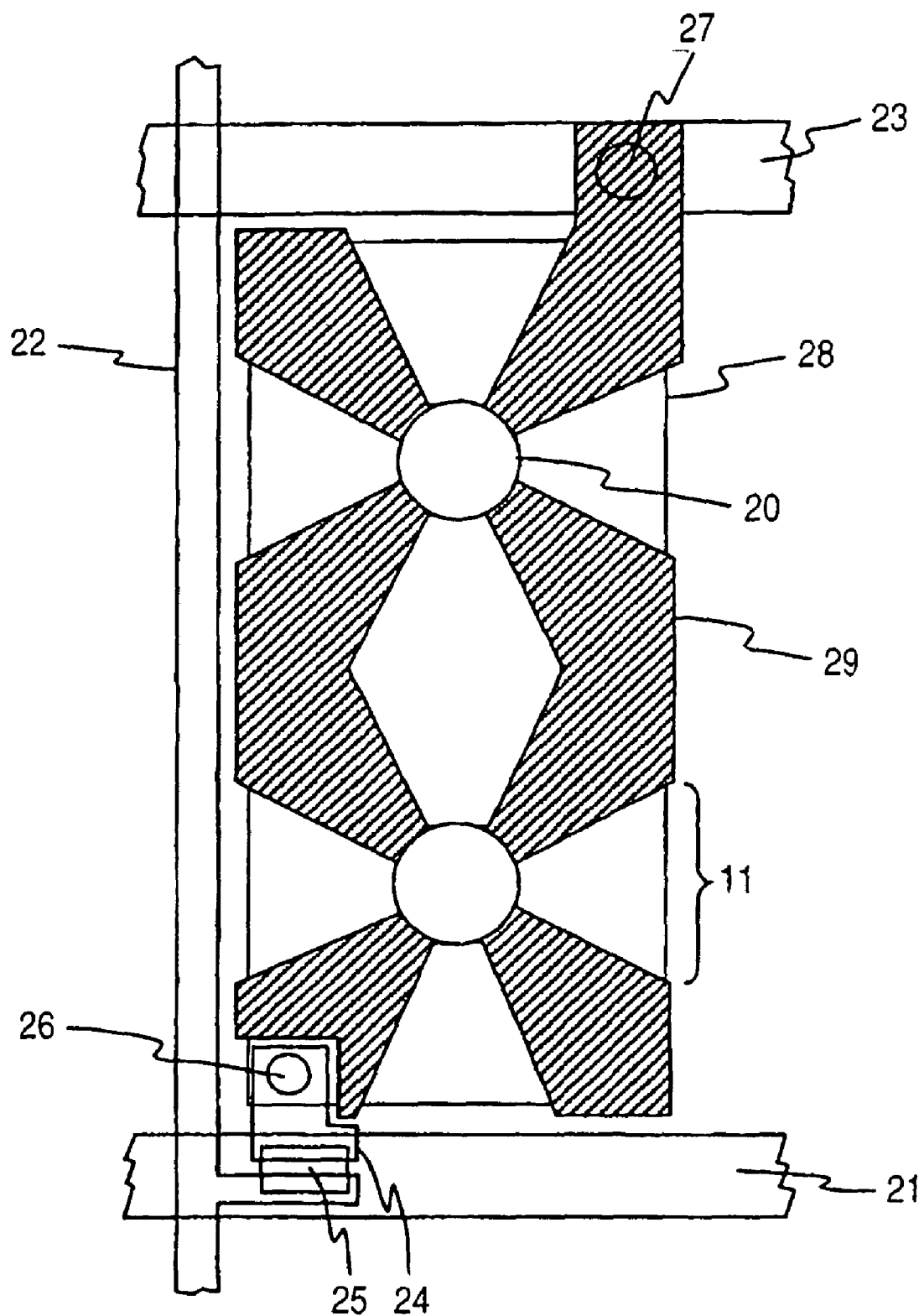
FIG. 26 is a plan view showing one example of a pixel structure of a liquid crystal display device according to a ninth embodiment.

FIG. 26 shows a case in which a reflective portion is disposed in the center portion of the unit electrode structure shown in FIG. 22, and a circular reflective electrode 20 is disposed in the center portion of the unit electrode structure. In the transmissive portion, the light passes through the liquid crystal layer only once. On the contrary, in the reflective portion, the light reciprocates the liquid crystal layer, and a change in the phase difference as much as the light reciprocates the liquid crystal layer causes a change in the reflectivity. As a result, there is an effect of apparently increasing a change in the alignment.

When the reflective electrode 20 is made of a metal that is high in reflectivity such as aluminum, the brighter reflective display can be obtained. However, there is a case in which the reflective electrode 20 comes in contact with the common electrode 29 that is made of ITO, a battery reaction occurs at the time of formation, and the reflective electrode 20 is lost. In order to prevent the above drawback, the reflective electrode 20 is formed by a two-layer structure made of aluminum and chrome molybdenum alloy, and chrome molybdenum alloy comes in contact with the common electrode 29, and aluminum that constitutes the reflective electrode 20 is out of contact with the common electrode 29.

Because of the VA type liquid crystal display device, the retardation at the time of applying no voltage is 0 nm in both of the reflective portion and the transmissive portion. A black display can be obtained at the same voltage value in both of the reflective portion and the transmissive portion.

In addition, the reflective portion is disposed in the center portion of the unit electrode structure in which a change in the alignment of the liquid crystal layer with a change in the voltage is relatively gentle, and the transmissive portion is disposed in a portion in which a change in the alignment is relatively precipitous. As a result, the applied voltage dependency of the transmissive light and the reflected light can be of the similar type. In this case, there is obtained the excellent display that is high in the contrast ratio and has no tone reversal under the same driving conditions in both of the reflective display and the transmissive display.

In the case where the manner of a change in the liquid crystal alignment with application of a voltage is identical between the reflective portion and the transmissive portion, in order to make the similar type of the applied voltage dependency of the transmissive light and the reflected light, the liquid crystal layer thickness of the reflective portion and the transmissive portion must be set to a relationship of about 1:2. In order to realize the above relationship, there is proposed a method of forming a step between the reflective portion and the transmissive portion.

As a specific example, returning to the seventh embodiment, the above step is formed with the use of the liquid crystal layer thickness adjustment layer 48 shown in FIG. 20 in the seventh embodiment. In this case, the alignment of the liquid crystal layer is disordered in the periphery of the liquid crystal layer thickness adjustment layer 48, and there is the possibility that the viewing performance such as the contrast ratio is deteriorated. In particular, in a small pixel of the size corresponding to the high precision display, because the are a ratio of the extent which is affected by the step is increased, the affection of the step becomes large. In this embodiment, since the liquid crystal layer thickness adjustment layer 48 is not required, it is advantageous in that the viewing performance is not deteriorated by provision of the step, and the applied voltage dependency of the transmissive light and the reflected light can be of the similar type.

Figure 30A:
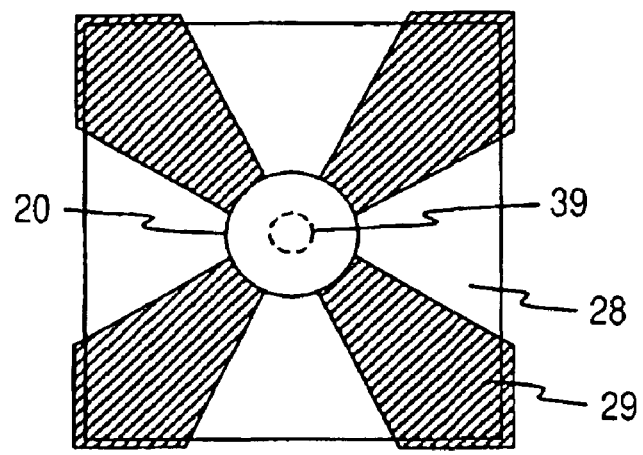
FIGS. 30A to 30C are plan views showing the configuration or distribution of concave/convex in the unit pixel structure having a reflective portion.

The asperity formation layer is disposed on the reflective portion to give smooth asperity to the surface of the reflective electrode, thereby making it possible to provide a diffusion reflective electrode. The asperity of the diffusion reflective electrode affects the spiral alignment in the center portion of the unit electrode structure. However, when the asperity distribution of the diffusion reflective electrode is symmetrical about circle, and the center of the diffusion reflective electrode substantially coincides with the center of the unit electrode structure, there is no adverse affection such that the spiral alignment is unstabilized. More specifically, the asperity that is disposed in the reflective portion is made circular, and only one asperity is disposed in the center of the reflective portion. FIG. 30A shows an example in which one circular asperity 39 is disposed in the center of the reflective portion 20, and the asperity 39 is indicated by a broken line. The asperity 39 is effective particularly in the case where the pixel size is sufficiently small.

The asperity formation layer is obtained by patterning, for example, an organic film in a cylindrical configuration, and then disposed between the third insulation layer 53 and the common electrode 29. Then, when the asperity formation layer is heated and melted, the asperity formation layer constitutes a projection indicative of a substantially two-dimensional curved surface due to the surface tension, and then solidified in this state. When the common electrode 29 and the reflective electrode 20 are sequentially formed on the upper surface of the projection, a gentle projection of the two-dimensional curved surface is formed on the surface of the reflective electrode 20. When it is assumed that the projection surface is divided into the fine surfaces, the respective fine surfaces are sloped with respect to the macroscopic plane of the liquid crystal display device. As a result, the angle of the reflected light on the respective fine surfaces does not satisfy the direct opposite condition in the macroscopic plane of the liquid crystal display device.

In addition, the angles of the reflected lights from the respective fine surfaces are different from each other. For that reason, the reflected light on the projection surface forms the diffusion light. As a result, for example, the specular reflection is reduced, the reflection of the surrounding scene is eliminated, and the display contents of the liquid crystal display device can be readily observed. Also, there is obtained such an advantage that the light inputted from the oblique direction is reflected toward the normal direction along which a user observes the display contents with high efficiency, and the effective reflectivity is increased.

Figure 30B:
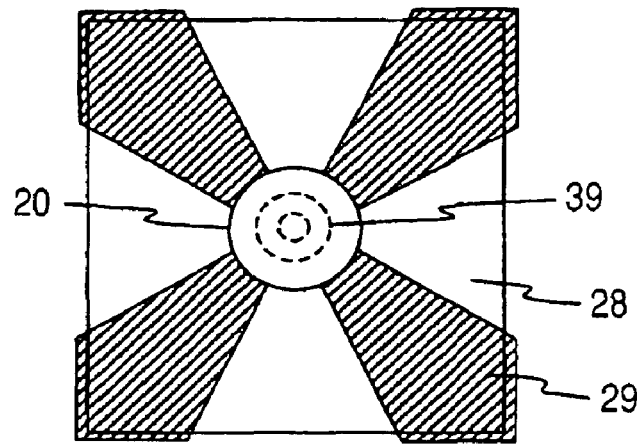

In the case where the pixel size is larger than the above size, or in the case where the broader area of the center portion of the unit electrode structure is used for the reflective portion, as shown in FIG. 30B, the asperity is shaped in a ring, and the center of the ring is so disposed as to substantially coincide with the center of the unit electrode structure.

Figure 30C:
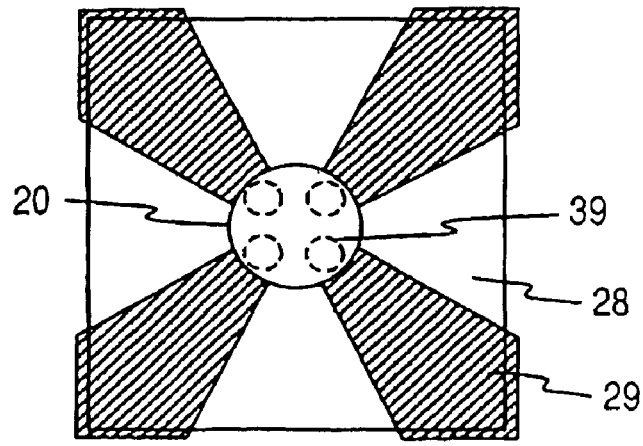

Also, in the case where the height of the asperity is sufficiently small, or in the case where the area of the reflective portion is relatively large, the plural circular asperities can be so disposed as to be symmetrical about rotation as shown in FIG. 30C. FIG. 30C shows an example in which four circular asperities are so disposed as to be symmetrical about rotation.

In the case where the asperities of the diffusion reflector are regularly arranged within a range of the collimated length of a source light, an interference may occur in the reflected light. The intensity of the reflected light is quickly changed as a direction of observing the liquid crystal display device by the user is changed, or the interference condition is different according to each of the wavelengths. As a result, spectral hues are observed on the display surface.

The above interference light appears remarkably particularly in the case where the liquid crystal display device is irradiated with a light emitted from a single light source, for example, direct sunlight. Therefore, the interference light is not preferable because the visibility is deteriorated. In order to reduce the interference light, it is possible that an optical path for the incident light is diffused by means of the light diffusion layer 47 to average the interference conditions as in the liquid crystal display device of the seventh embodiment shown in FIG. 20.

Also, the arrangement of the asperity may be displaced from the regular arrangement at random. For example, as shown in FIG. 30A, in the case where the single circular asperity is disposed substantially in the center portion of the unit pixel structure, the asperity may be disposed at a position displaced from the center portion of the unit pixel structure to the degree which is capable of ensuring the stability of the liquid crystal alignment, and the displacement direction may be different according to the respective unit pixel structures.

As another method of making the liquid crystal display device according to the present invention transflective, there is a method in which one or some of the plural unit electrode structures that are distributed within one pixel constitute the reflective portions. In order to make the applied voltage characteristic of the reflective display and the applied voltage characteristic of the transmissive display approach the same characteristic, it is better that the thickness of the liquid crystal layer of the reflective portion is set to about half of that of the transmissive portion for the above reason. In fact, for the reflective portion, for example, the thickness of the insulation film on the second substrate is thickened in the reflective portion. Also, a step formation layer may be disposed on a portion corresponding to the reflective portion on the first substrate.

As described above, the reflective display is enabled in addition to the transmissive viewing performance of the eighth embodiment. The visibility when the liquid crystal display device is used under the bright circumstances such as the outdoors in fine weather is improved in addition to the display with the wider viewing angle indoors.

Tenth Embodiment

Figure 31:
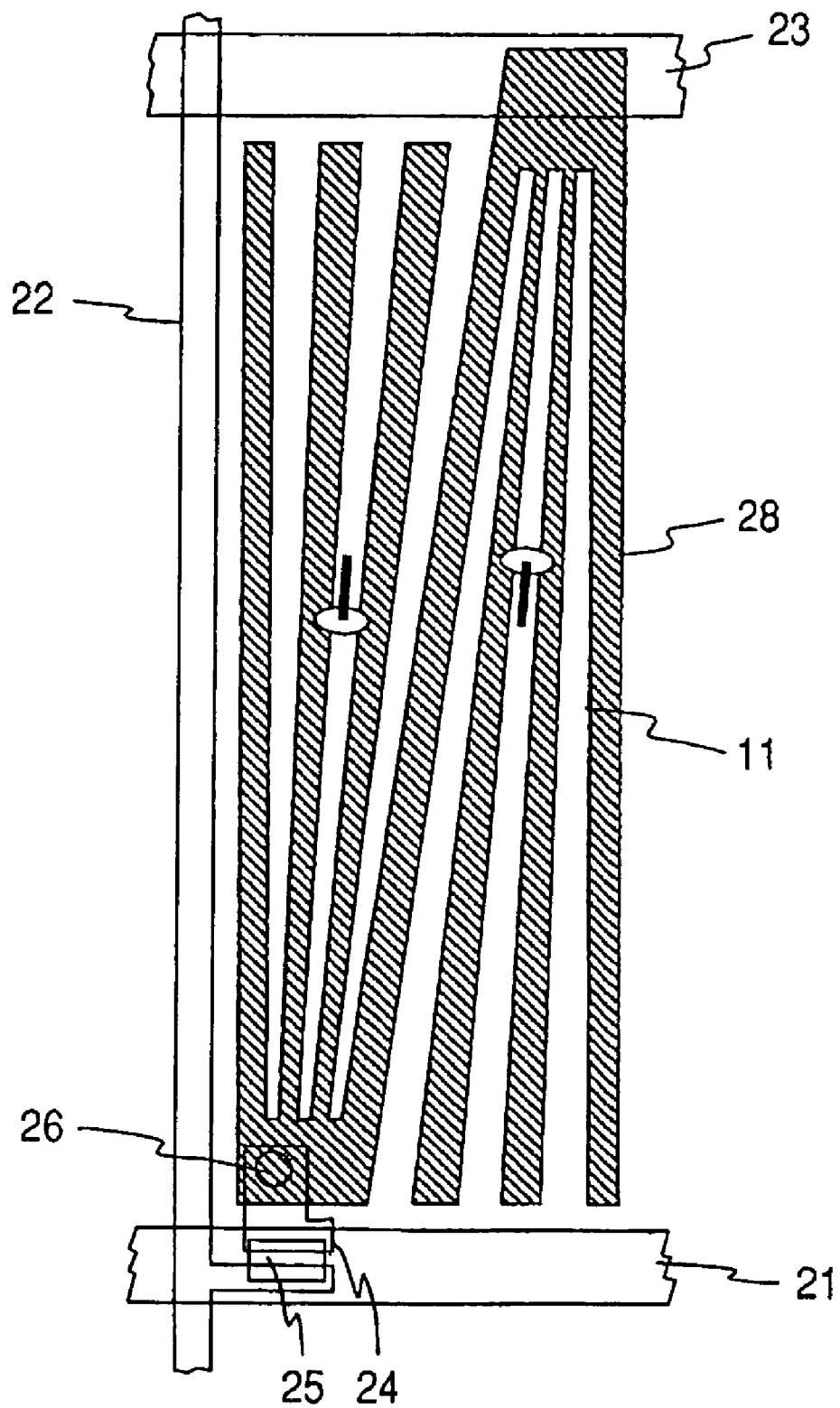
FIG. 31 is a top view showing one pixel of a liquid crystal display device according to a tenth embodiment, viewed from a normal direction.
Figure 32:
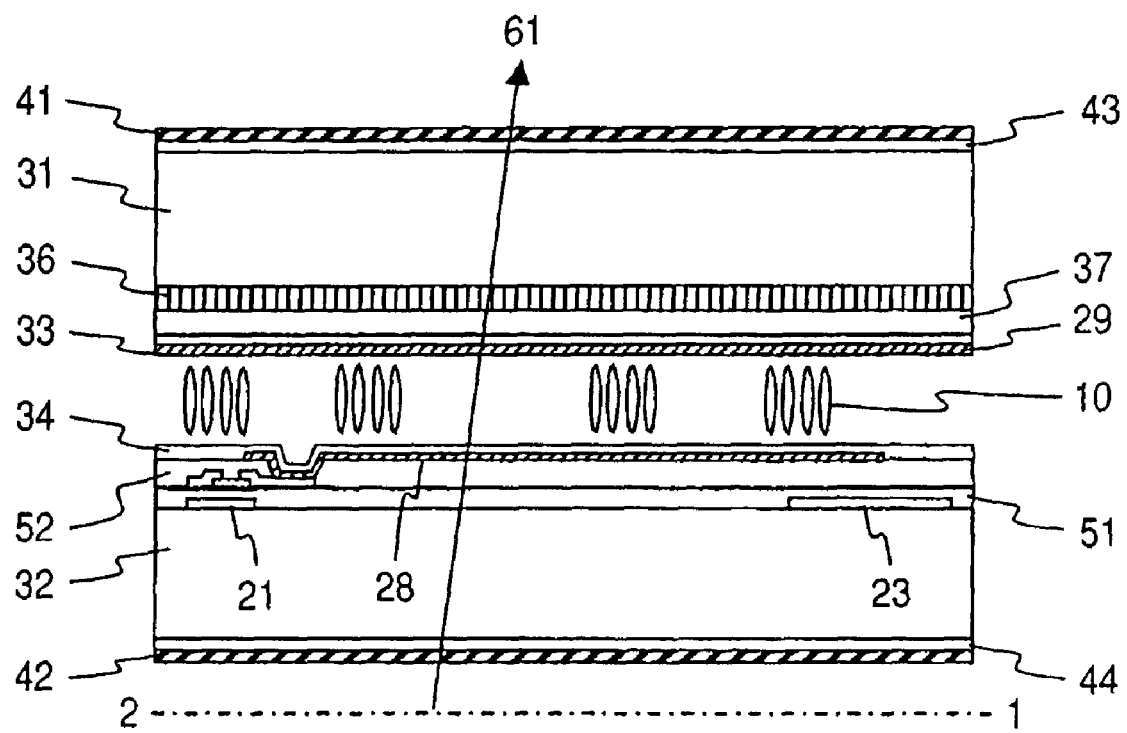
FIG. 32 is a cross-sectional view of one pixel of the liquid crystal display device according to the tenth embodiment.

FIG. 32 shows a cross-sectional view of one pixel that constitutes a liquid crystal display device according to this embodiment (a cross-sectional view taken along a chain line 1-2 shown in FIG. 31). FIG. 31 shows a top view of a second substrate 32 observed from the normal direction. In this embodiment, the common electrode is formed at the first substrate side, and the pixel electrode is formed at the second substrate side. An electric field that is applied to the liquid crystal layer is substantially in parallel to a direction normal to the substrate. The plane configuration of the pixel electrode shown in FIG. 31 is similar to the common electrode shown in FIG. 11. Two assemblies consisting of the slits whose pitches are continuously changed are provided, the pitch is widest at one end of the pixel, and narrowest at the other end thereof. Also, directions of increasing the pitches of the assemblies of the respective slits are opposite to each other.

Figure 33A:
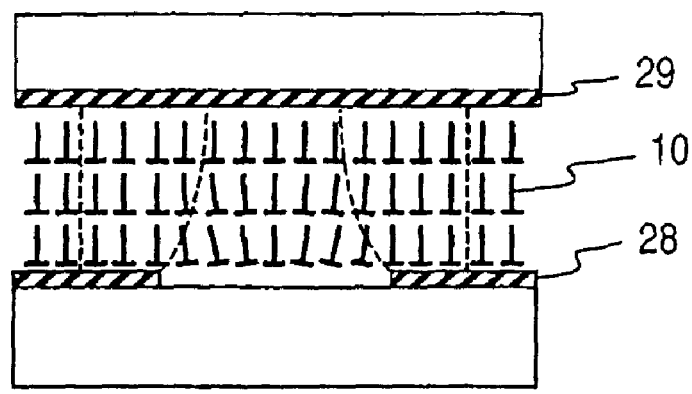
FIGS. 33A to 33C are cross-sectional views the alignment state of a liquid crystal layer in a portion sufficiently apart from a slit terminal in a direction crossing a slit within one pixel shown in FIG. 32.

FIG. 33 shows a cross-sectional view taken along a direction that crosses the slits 11 within one pixel shown in FIG. 32 (a partial cross-sectional view taken along a chain line 1-2 shown in FIG. 31). FIG. 33 shows the alignment state of the liquid crystal layer 10 in a portion sufficiently apart from the slit terminal. An electric field is developed in the liquid crystal layer 10 when a voltage is applied, and the lines of electric force are in parallel to the direction normal to the substrate on the pixel electrode. However, in the slit portion, the lines of electric force are curved toward the inside of the slits, and do not become in parallel to the direction normal to the substrate, as a result of which a change in the alignment occurs in the liquid crystal layer. In the case where the electric field is weak, as shown in FIG. 33A, a change in the alignment mainly occurs on the slit close to the boundary with the pixel electrode 28 (a portion close to the slit boundary), and a vertical alignment remains as it is, in the centers of the slits 11 and in the center of the pixel electrode 28.

Figure 33B:
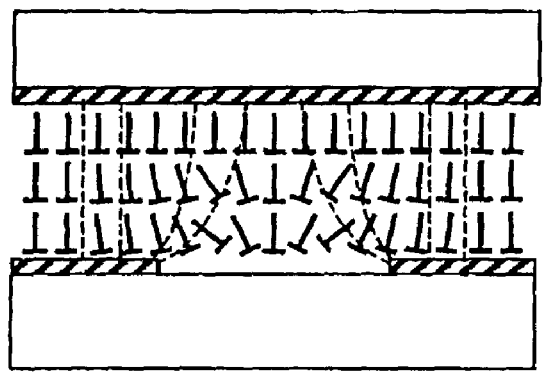
Figure 33C:
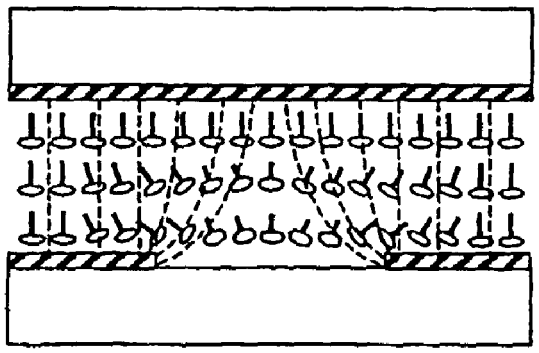

The slope of the liquid crystal layer 10 on the portion close to the slit boundary occurs in the cross section of FIG. 33A. However, because the slope directions on the portion close to the slit boundary are opposite to each other, a spray deformation occurs in the liquid crystal layer 10. In the case where the electric field is strong, the spray deformation becomes larger as shown in FIG. 33B. In case where the electric field is further strong, in order to relieve the electric field, the entire liquid crystal layer 10 including the centers of the slits and the center of the pixel electrode is sloped in the slit direction, that is, in a direction perpendicular to the cross section of FIGS. 33A to 33C, as shown in FIG. 33C.

Figure 34A:
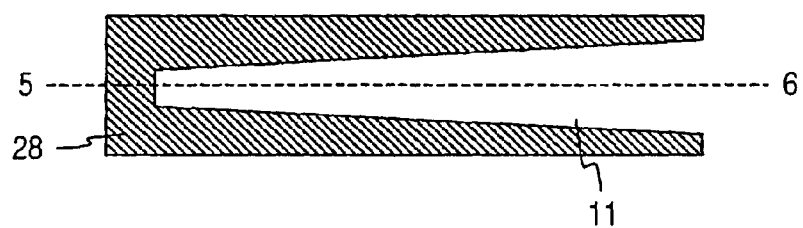
FIGS. 34A and 34B are cross-sectional views showing liquid crystal alignment control by a common electrode and a pixel electrode.
Figure 34B:
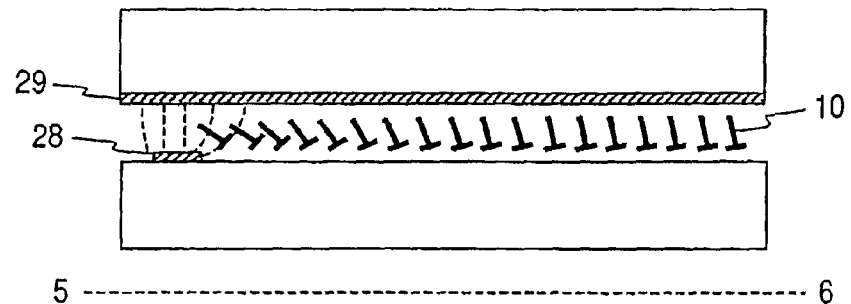

FIGS. 34A and 34B show the liquid crystal alignment control by means of the common electrode 29 and the pixel electrode 28. FIG. 34A shows the partial extraction (a portion taken along a dotted line 5-6) of the repetition structure which is produced by the pixel electrode 28 shown in FIG. 31, and includes one slit 11. FIGS. 34B and 34C are cross sections taken along a dotted line 5-6 of FIG. 34A, which are perpendicular to the cross sections shown in FIGS. 33A to 33C. FIG. 34B shows an alignment state at the time of applying no voltage, and the liquid crystal layer is vertically aligned. FIG. 34C shows an alignment state at the time of applying a voltage, and the lines of electric force that are curved toward the slits are developed on the ends of the slits. Also, although not shown in FIG. 34C, the spray deformation is produced in the liquid crystal layer 10 in a direction perpendicular to the surface of FIG. 34C, as shown in FIG. 33B. In order to relieve the spray deformation, with the lines of electric force that have been curved on the ends of the slits as a turning point, the liquid crystal layer 10 is sloped along the slits 11.

The pixel electrode shown in FIG. 31 has two slit assemblies whose slit ends are positioned in the vicinity of the shorter side of the pixel, and which are in the vicinity of the shorter sides of the pixel at the sides opposite to each other. Because the liquid crystal alignment directions at the time of applying a voltage are opposite to each other in the respective slits, the liquid crystal layer within one pixel is divided into two domains at the time of applying a voltage.

Figure 35A:
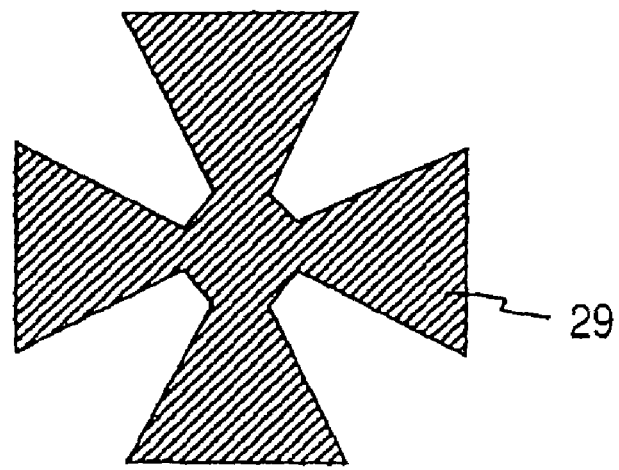
FIGS. 35A and 35B are diagrams showing an example of a pixel electrode in which the slits are arranged in a radial fashion in the tenth embodiment.
Figure 35B:
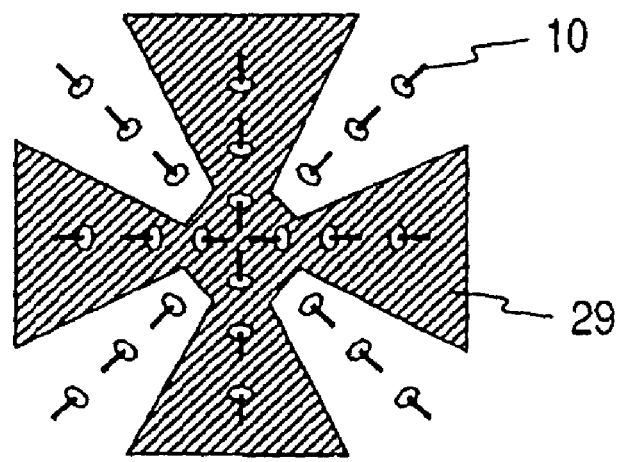

FIG. 35A is an example of the pixel electrode in which the slits are disposed in the radial fashion. Since the lines of electric force are curved on the respective slits, the radial liquid crystal alignment is formed on the pixel electrode at the time of applying a voltage as shown in FIG. 35B. Because the liquid crystal layer is so aligned as to be directed toward all directions at the time of applying a voltage, the azimuth dependency of the oblique characteristic is also averaged. For that reason, fore example, when the observation direction is changed so that the polar angle is kept constant, and the azimuth is changed, the constant viewing performance is obtained not depending on the azimuth.

As another method of realizing the radial liquid crystal alignment, there is a method using an alignment control projection. That is, an alignment control projection that is circular in the plan structure and trapezoidal or two-dimensionally curved in the cross sectional structure is disposed on the common electrode corresponding to the center of the pixel electrode shown in FIG. 35A. The liquid crystal layer that is disposed in proximity to the alignment control projection is so aligned as to be perpendicular to the surface of the alignment control projection at the time of applying no voltage. With the above structure, the liquid crystal alignment direction at the time of applying a voltage is determined. In this case, the alignment direction of the liquid crystal layer is sloped with respect to the direction normal to the substrate in the vicinity of the alignment control projection. For that reason, the transmittance at the time of the dark display is increased, thereby causing the contrast ratio to be deteriorated. In order to prevent the contrast ratio from being deteriorated, there is proposed that a black matrix is disposed in the vicinity of the alignment control projection to shield the light. However, this suffers from the adverse reaction that deteriorates the transmittance of the bright display. The pixel electrode shown in FIG. 35A is capable of aligning the liquid crystal layer in the radial fashion at the time of applying a voltage while vertically aligning the liquid crystal layer at the time of applying no voltage. As a result, the pixel electrode is advantageous in that the deterioration of the contrast ratio and the deterioration of the bright display transmittance are not caused as compared with the alignment control projection.

Figure 36:
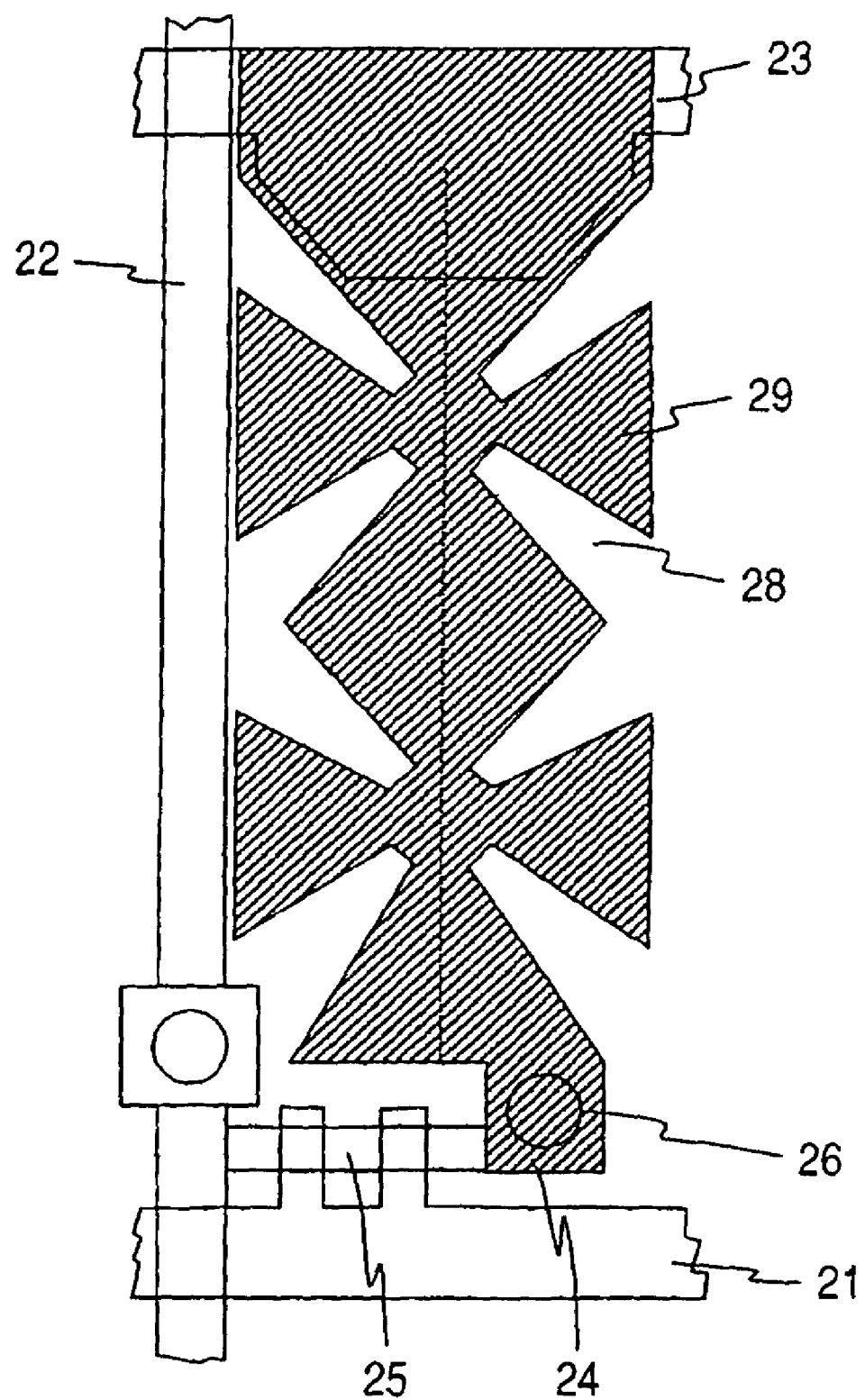
FIG. 36 is a diagram showing an example in which plural pixel elements having radial slits are disposed in one pixel in the tenth embodiment.

FIG. 36 shows an example in which radial slits are arranged in the pixel electrode within one pixel. FIG. 36A is an example in which two pixel electrodes shown in FIG. 35A are arranged, and two radial liquid crystal alignments are produced within one pixel at the time of applying a voltage. In this case, the spiral alignment is produced on the boundary of two radial liquid crystal alignments. The liquid crystal alignment direction is not sufficiently sloped with respect to the direction normal to the substrate in the vicinity of the center of the spiral alignment even if a voltage is applied. As a result, an increase in the transmittance is small. The number of spiral alignments within one pixel should be reduced toward zero after the stabilization of the liquid crystal alignment at the time of applying a voltage is ensured.

FIG. 36B is an example in which one radial slit is disposed within one pixel, and the radial slit is configured in a rectangle according to the configuration of the pixel. Because one radial liquid crystal alignment is produced within one pixel at the time of applying a voltage, an excessive spiral alignment is not produced as in the case of FIG. 35A.

In this embodiment, the electrode (common electrode) having the same radial slit structure as that in the ninth embodiment is employed, but the common electrode is formed on the first substrate, and the pixel electrode is formed on the second substrate. Because the liquid crystal display device according to this embodiment is capable of applying an stronger electric field to the entire area of the liquid crystal layer, it is possible to drive the liquid crystal display device at a lower voltage as compared with the ninth embodiment.

Figure 37:
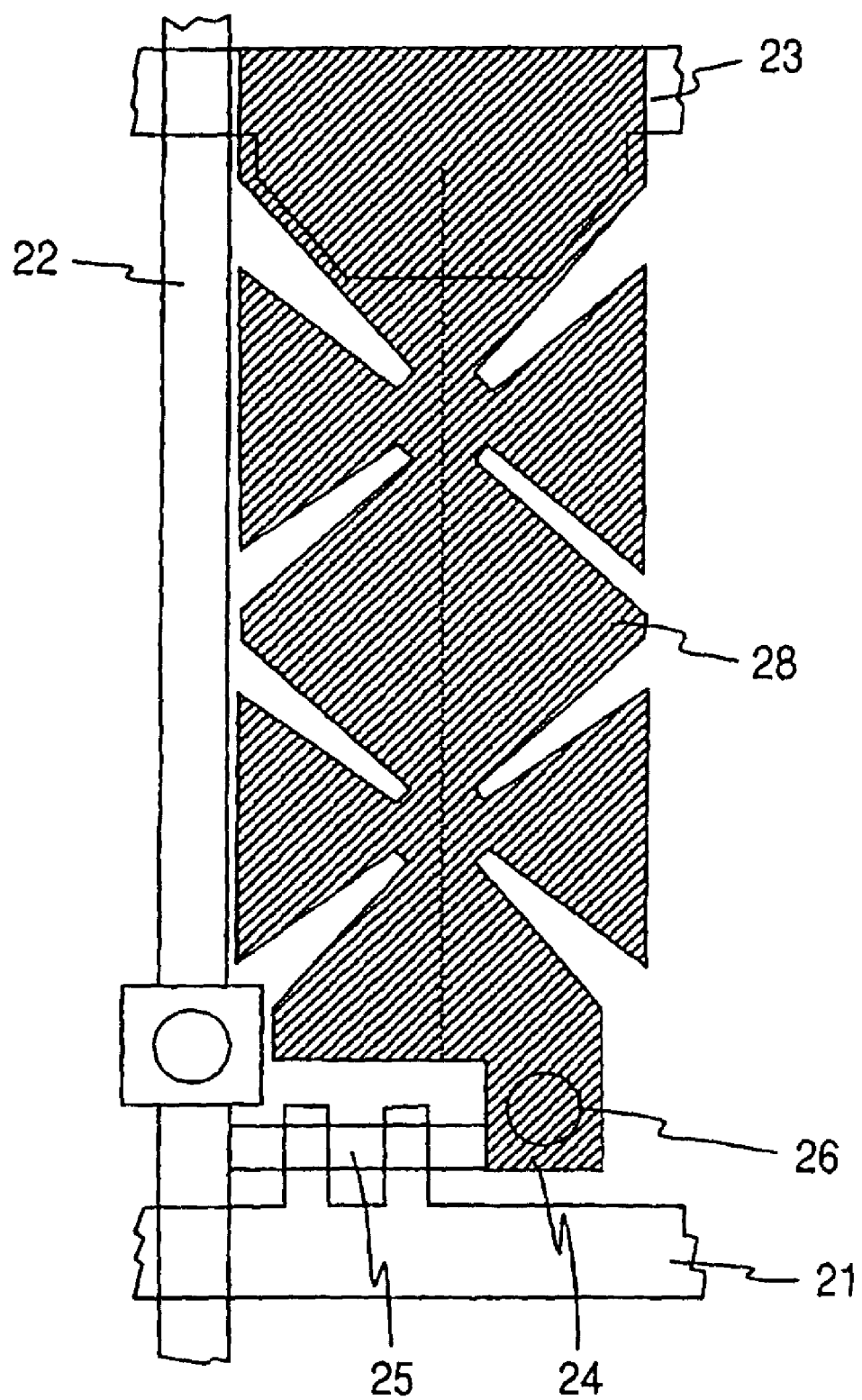
FIG. 37 is a diagram showing an example in which the distribution of the slit structure is radial as in FIG. 36, and the slit width is minimum and constant in the tenth embodiment.

FIG. 37 is an example in which the distribution of the slit structure is radial as in FIG. 36, and the widths of the slits are minimized and kept constant. The slit portion is required for the alignment control, but no pixel electrode exists, and there exist only the lines of electric force that are formed between the surrounding pixel electrode and the common electrode and curved. When the slits are sufficiently wide, the liquid crystal layer is not driven in the center of the slit portion by the electric field, and the alignment is merely changed according to a change in the surrounding liquid crystal alignment. Thus, since the slit portions are weak in the intensity of the electric field, the driving voltage of the liquid crystal layer is locally increased. Because the driving voltage of the entire pixel is substantially equal to the area average of the slit portions and other portions, the driving voltage of the entire pixel is increased as the widths of the slit portions are wider. In FIG. 37, because the widths of the slits are minimum, the area ratio of the slit portions that occupy the pixel is small, and the effect of reducing an increase in the driving voltage which is attributable to the slip portions is obtained.

However, because the curvature of the lines of electric force is reduced when the widths of the slits are extremely reduced, the liquid crystal alignment at the time of applying a voltage becomes unstable. In order to minimize the widths of the slits while stably keeping the liquid crystal alignment at the time of applying a voltage, the widths of the slits may be set to the same degree as the thickness of the liquid crystal layer. In this case, it is possible to minimize a portion of the liquid crystal layer that changes the alignment according to a change in the surrounding liquid crystal alignment without being driven by the electric field although the curved lines of electric force remain.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A liquid crystal display device, comprising:
   a first substrate;
   a second substrate; and
   a liquid crystal layer;
   wherein the first substrate and the second substrate face each other through the liquid crystal layer, a pixel electrode that forms a pixel and a common electrode are disposed over the second substrate, one of the pixel electrode and the common electrode has a plurality of slit like apertures at least partially delimited by adjacent electrode portions of the one of the pixel electrode and the common electrode, the adjacent electrode portions being joined at least one part of the pixel, another of the pixel electrode and the common electrode has no slit like aperture, an electric field having a parallel component with respect to a substrate surface is applied between the pixel electrode and the common electrode, the liquid crystal layer whose dielectric anisotropy is negative in a state where no electric field is applied is aligned in a direction that is substantially normal to the substrate, and a first polarizer and a second polarizer are disposed outside of the first substrate and the second substrate;

wherein the another of the pixel electrode and the common electrode having no slit like aperture is superposed with the one of the pixel electrode and the common electrode having the plurality of slit like apertures through an insulation layer disposed therebetween;

wherein the liquid crystal layer to which an electric field is applied by means of the pixel electrode and the common electrode is divided into multi-domains;

wherein the multi-domains are performed by at least one slit like aperture of the plurality of slit like apertures of the one of the pixel electrode and the common electrode in which edges of the adjacent electrode portions delimiting a width of the at least one slit like aperture diverge from one another in a direction away from a joined portion of the adjacent electrode portions so that both of the width of the plurality of slit like apertures and a width of a plurality of the adjacent electrode portions in the pixel substantially continuously increase in a direction away from the joined portions of the adjacent electrode portions, the plurality of slit like apertures and the plurality of the adjacent electrode portions being arranged around respective ones of the joined portions; and wherein the one of the pixel electrode and the common electrode having the plurality of slit like apertures has portions which extend beyond edges of the another of the pixel electrode and the common electrode in the direction away from the joined portions of the adjacent electrode portions.

2. The liquid crystal display device according to claim 1, wherein the one of the pixel electrode and the common electrode which is disposed in proximity to the liquid crystal layer has the slit like apertures.

3. The liquid crystal display device according to claim 2, wherein a slit structure is distributed to an end of the one of the pixel electrode and the common electrode on one end thereof, and the one of the pixel electrode and the common electrode which is close to the liquid crystal layer is distributed to an outside of the pixel at an end of the pixel in which the slit structure is distributed to the end of the one of the pixel electrode and the common electrode.

4. The liquid crystal display device according to claim 1, wherein the multi-domains are performed by provision of an alignment control structure that shifts the alignment direction of the liquid crystal layer from the direction normal to the substrate at a side of the first substrate or the second substrate which is disposed in proximity to the liquid crystal layer.

5. The liquid crystal display device according to claim 1, wherein a transmission axes of the first polarizer and the second polarizer are orthogonal to each other, an optically anisotropic medium whose index anisotropy is negative is disposed between the first polarizer and the first substrate and between the second polarizer and the second substrate, respectively.

6. The liquid crystal display device according to claim 1, wherein a first quarter wave plate is disposed between the first polarizer and the first substrate, a second quarter wave plate is disposed between the second polarizer and the second substrate, and the first quarter wave plate and the second quarter wave plate are orthogonal in a slow axis to each other.

7. The liquid crystal display device according to claim 1, wherein a first quarter wave plate and a first half wave plate are disposed between the first polarizer and the first substrate, a second quarter wave plate and a second half wave plate are disposed between the second polarizer and the second substrate, the first quarter wave plate is closer to the first substrate than the first half wave plate, the second quarter wave plate is closer to the second substrate than the second half wave plate, the first quarter wave plate and the second quarter wave plate are orthogonal in a slow axis to each other, and the first half wave plate and the second half wave plate are orthogonal in the slow axis to each other.

8. The liquid crystal display device according to claim 1, wherein the plurality of slit like apertures are close to each other so that respective slits are coupled with each other.

9. The liquid crystal display device according to claim 1, wherein the width of the slit like apertures decreases in a direction toward the joined portions of the adjacent electrode portions.

10. The liquid crystal display device according to claim 1, wherein one of the joined portions of the adjacent electrode portions is disposed at least a center part of the pixel.

11. The liquid crystal display device according to claim 1, wherein at least one of the joined portions of the adjacent electrode portions is disposed at least an end part of the pixel.

12. The liquid crystal display device according to claim 1, wherein the width of one of the adjacent electrode portions between two of the slit like apertures substantially continuously increases from the joined portion of the adjacent electrode portions in the pixel toward edges of the pixel.

13. The liquid crystal display device according to claim 12, wherein the width of one of the adjacent electrode portion between the two of the slit like apertures substantially continuously increases from the joined portion of the adjacent electrode portions at a center of the pixel toward the edges of the pixel.

14. The liquid crystal display device according to claim 1, wherein the adjacent electrode portions between two slit like apertures in the pixel are distributed in the pixel in a fan configuration from the joined portions of the adjacent electrode portions.

15. The liquid crystal display device according to claim 1, wherein the width of all of the electrode portions between two slit like apertures substantially continuously increase from the joined portions of the adjacent electrode portions in the pixel toward edges of the pixel.

16. The liquid crystal display device according to claim 15, wherein the width of all of the electrode portions between the two of the slit like apertures substantially continuously increase from the joined portions of the adjacent electrode portions at a center of the pixel toward the edges of the pixel.

17. The liquid crystal display device according to claim 1, wherein at least one of the slit like apertures proximate to a center of the pixel has two substantially opposite parts which substantially continuously increase from two respective joined adjacent electrode portions and are joined together.

* * * * *